United States Patent
Shibata

(10) Patent No.: US 9,254,644 B2
(45) Date of Patent: Feb. 9, 2016

(54) IMAGE PROCESSING DEVICE, METHOD, AND PROGRAM, AS WELL AS INKJET RECORDING DEVICE

(71) Applicant: FUJIFILM Corporation, Tokyo (JP)

(72) Inventor: Hiroyuki Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/748,041

(22) Filed: Jun. 23, 2015

(65) Prior Publication Data

US 2015/0290930 A1  Oct. 15, 2015

Related U.S. Application Data

(63) Continuation of application No. PCT/JP2014/050115, filed on Jan. 8, 2014.

(30) Foreign Application Priority Data

Jan. 28, 2013 (JP) ................................. 2013-013097

(51) Int. Cl.
B41J 29/38 (2006.01)
B41J 2/045 (2006.01)

(52) U.S. Cl.
CPC ............ *B41J 2/0451* (2013.01); *B41J 2/04586* (2013.01)

(58) Field of Classification Search
CPC ...... B41J 2/2139; B41J 2/2146; B41J 2/0451; B41J 2/04586
USPC ................................................. 347/9, 14, 19
See application file for complete search history.

(56) References Cited

U.S. PATENT DOCUMENTS

| 6,575,549 | B1* | 6/2003 | Silverbrook ........... B41J 2/2139 347/14 |
| 2006/0071955 | A1 | 4/2006 | Arazaki |
| 2007/0057986 | A1 | 3/2007 | Arazaki et al. |
| 2015/0224761 | A1* | 8/2015 | Sato ...................... B41J 2/0451 347/14 |

FOREIGN PATENT DOCUMENTS

| JP | 2006-076086 A | 3/2006 |
| JP | 2006-130904 A | 5/2006 |
| JP | 2006-182023 A | 7/2006 |
| JP | 2007-098937 A | 4/2007 |

OTHER PUBLICATIONS

International Search Report; PCT/JP2014/050115; Feb. 18, 2014.
Written Opinion of the International Search Report; PCT/JP2014/050115; Feb. 18, 2014.

* cited by examiner

*Primary Examiner* — Julian Huffman
*Assistant Examiner* — Sharon A Polk
(74) *Attorney, Agent, or Firm* — Studebaker & Brackett PC

(57) ABSTRACT

The image processing device divides image data into regions corresponding to a first pixel row, a second pixel row, a third pixel row, and a fourth pixel row, and generate output data, in which a generation rate of an ink droplet with a relatively large size, a generation rate of an ink droplet with a relatively small size, and the amount of ink discharged per unit area vary depending on a gradation value of the image data, for each of the divided regions. At the time of the generation of the output data, different output data items are generated for a third nozzle corresponding to the third pixel row when the first gradation value indicates a relatively high gradation and when the first gradation value indicates a relatively low gradation.

13 Claims, 18 Drawing Sheets

FIG. 4

| VISIBILITY | | HIGHLIGHT TO HALFTONE | SHADOW TO SOLID |
|---|---|---|---|
| VISIBILITY | VISIBILITY OF VOID IN ABNORMAL PORTION | SINCE AVERAGE CONCENTRATION IS LOW, CONTRAST OF VOID PORTION IS LOW AND VOID PORTION IS LESS LIKELY TO BE SEEN | SINCE AVERAGE CONCENTRATION IS HIGH, CONTRAST OF VOID PORTION IS HIGH AND VOID PORTION IS LIKELY TO BE SEEN |
| | VISIBILITY OF CORRECTION WIDTH (SHADING) | LARGE WIDTH→WIDTH IS LIKELY TO BE SEEN | CORRECTION WIDTH IS LESS LIKELY TO BE SEEN |
| | VISIBILITY OF CORRECTION WIDTH (IMAGE STRUCTURE) | LARGE WIDTH→WIDTH IS LIKELY TO BE SEEN | LARGE WIDTH→WIDTH IS LIKELY TO BE SEEN |
| CORRECTION METHOD FOR MAKING STREAK LESS LIKELY TO BE SEEN | VOID | IT IS NOT NECESSARY TO FILL VOID | IT IS NECESSARY TO FILL VOID |
| | CORRECTION WIDTH | IT IS NECESSARY TO REDUCE CORRECTION WIDTH | WHEN IMAGE STRUCTURE (VOID PATTERN) IS REMOVED, SHADING CORRECTION MAY BE PERFORMED |

FIG. 16

IMAGE PROCESSING DEVICE, METHOD, AND PROGRAM, AS WELL AS INKJET RECORDING DEVICE

CROSS-REFERENCE TO RELATED APPLICATIONS

This application is a Continuation of PCT International Application No. PCT/JP2014/50115, filed on Jan. 8, 2014, which claims priority under 35 U.S.C. §119(a) to Japanese Patent Application No. 2013-013097, filed on Jan. 28, 2013. Each of the above application(s) is hereby expressly incorporated by reference, in its entirety, into the present application.

BACKGROUND OF THE INVENTION

1. Field of the Invention

The present invention relates to an image processing device, an image processing method, a non-transitory computer readable medium storing an image processing program, and an inkjet recording device, and more particularly, to a technique for correcting streak unevenness caused by a defective nozzle of an inkjet head.

2. Description of the Related Art

In a single-pass-type inkjet printer (inkjet recording device), streak unevenness occurs in the transportation direction of a sheet due to a defective nozzle such as a non-discharging nozzle or a nozzle which discharges ink in an incorrect direction. In order to solve the problem, a technique is known which masks a defective nozzle and controls concentration in the vicinity of the defective nozzle to reduce the visibility of streaks.

As a method for controlling concentration in the vicinity of the defective nozzle, a technique is known which modulates a plurality of pixels in the vicinity of the defective nozzle. For example, JP2006-76086A discloses a technique which corrects a gradation value in the vicinity of a defective nozzle on the basis of the amount of correction that is reduced as the distance from the defective nozzle increases and controls a recording head such that a larger dot is recorded as the gradation value becomes larger.

In addition, as another method for controlling concentration in the vicinity of the defective nozzle, a technique is known which changes a dot size and fills a streak that occurs due to, for example, a curved discharge with dots to correct the streak.

For example, JP2006-130904A discloses a technique which, when the occurrence of a banding phenomenon is expected on the basis of the characteristic information of a head, converts image data such that the size of some or all of the dots related to the banding phenomenon is changed to a size different from the size of the dot when the occurrence of the banding phenomenon is not expected.

In addition, JP2006-182023A discloses a technique which changes a dot size on the basis of the discharge accuracy information of a head to generate printing data and performs printing on the basis of the generated print data.

JP2007-98937A discloses a technique which determines the generation rate of dots with a different size for each predetermined region of image data on the basis of acquired concentration unevenness information and converts the image data into N-values on the basis of the determined generation rate.

SUMMARY OF THE INVENTION

The technique which masks the defective nozzle and controls concentration in the vicinity of the defective nozzle generally has the following problems.

First, since correction is not performed according to the visibility of the streak, the streak is seen after the correction. In particular, in a shadow region, even when average concentration in the arrangement direction of the nozzles is controlled to be equal to the surrounding concentration, white streaks caused by the defective nozzle are seen. When the amount of ink discharged from nozzles (correction nozzles) adjacent to the defective nozzle is increased in order to suppress the occurrence of the white streaks, black streaks occur. That is, it is difficult to remove concentration contrast.

As disclosed in JP2006-76086A, when concentration in the vicinity of the correction nozzle is changed to suppress the occurrence of black streaks, the region used for correction is expanded. In addition, since an image structure in the expanded region is different from a peripheral image structure, banding remains.

Second, when correction is performed in a single color and the same parameters are applied to a mixed color, streaks which have not occurred in the single color are seen in the mixed color. In particular, as in JP2006-130904A, JP2006-182023A, and JP2007-98937A, when correction is performed to increase the size of the dots in the vicinity of the streak, the visibility of the streak is reduced since voids are filled with ink droplets in the single color. However, when the average dot size is large, coloring efficiency is reduced even though the same amount of ink is used. Therefore, a relatively large amount of ink is needed in order to obtain the same concentration. As a result, the colors are mixed. When the state of the base is changed, coloring efficiency is changed. In the mixed color, a concentration difference from the surroundings occurs and is seen as a streak.

As such, the techniques disclosed in JP2006-76086A, JP2006-130904A, JP2006-182023A, and JP2007-98937A have a problem in that streaks are not sufficiently suppressed in the single color or the mixed color.

The invention has been made in view of the above-mentioned problems and an object of the invention is to provide an image processing device, an image processing method, a non-transitory computer readable medium storing an image processing program, and an inkjet recording device which can reduce the visibility of streaks caused by a defective nozzle, regardless of whether image data is in a high gradation range or a low gradation range.

In order to achieve the object, according to an aspect of the invention, there is provided an image processing device including: an image data acquisition unit acquiring image data recorded by discharging ink droplets from a plurality of nozzles, which are provided in an inkjet head and can discharge at least a first ink droplet and a second ink droplet smaller than the first ink droplet, while moving a recording medium and the inkjet head in a first direction relative to each other; a defective nozzle specifying unit specifying a defective nozzle from the plurality of nozzles; a division unit dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and an output data generation unit performing at least a gamma conversion process and halftone processing on the image data to generate output data. The output data generation unit generates output data, in which a generation rate of the first ink droplet, a generation rate of the second ink droplet, and an amount of ink discharged per unit area vary depending on a gradation value of the image data, for each of the divided regions, and generates the following output data for image data with a first gradation value: the output data causes the defective nozzle not to discharge ink; the output data causes a fourth nozzle corresponding to the fourth pixel row to discharge a first amount of ink per unit area, using the generation rate of the first ink droplet as a first generation rate and the generation rate of the second ink droplet as a second generation rate; the output data causes the generation rate of the first ink droplet to be higher than the first generation rate and causes a second nozzle corresponding to the second pixel row to discharge a second amount of ink more than the first amount of ink per unit area; the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

According to this aspect, the image data is divided into the regions corresponding to the first pixel row which corresponds to the defective nozzle and is arranged in the first direction, the second pixel row which is adjacent to the first pixel row, the third pixel row which is adjacent to the second pixel row on a side opposite to the first pixel row, and the fourth pixel row other than the first pixel row, the second pixel row, and the third pixel row. The output data, in which the generation rate of the first ink droplet, the generation rate of the second ink droplet smaller than the first ink droplet, and the amount of ink discharged per unit area vary depending on the gradation value of the image data, is generated for each of the divided regions. The following output data is generated for the image data with the first gradation value: the output data causes the defective nozzle not to discharge ink; the output data causes the fourth nozzle corresponding to the fourth pixel row to discharge the first amount of ink per unit area, using the generation rate of the first ink droplet as the first generation rate and the generation rate of the second ink droplet as the second generation rate; the output data causes the generation rate of the first ink droplet to be higher than the first generation rate and causes the second nozzle corresponding to the second pixel row to discharge the second amount of ink more than the first amount of ink per unit area; the output data causes the generation rate of the second ink droplet to be higher than the second generation rate and causes the third nozzle corresponding to the third pixel row to discharge the third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value. Therefore, it is possible to reduce the visibility of a streak caused by the defective nozzle, regardless of whether image data is in a high gradation range or a low gradation range.

It is preferable that the output data generation unit generates, for the third nozzle, output data in which, as the first gradation value is relatively changed from a high gradation to a low gradation, the generation rate of the second ink droplet is continuously changed from a generation rate higher than the second generation rate to the second generation rate and the amount of ink discharged per unit area is continuously changed from the third amount of ink to the first amount of ink. According to this structure, it is possible to reduce the visibility of a streak caused by the defective nozzle in the entire gradation range of the image data.

When the first amount of ink is $V_1$, the second amount of ink is $V_2$, and the third amount of ink is $V_3$, it is preferable that the output data generation unit generates data satisfying $V_1 = (2V_2 + 2V_3)/5$, regardless of the first gradation value. According to this structure, it is possible to maintain the same concentration as that of the surrounding regions and thus to appropriately reduce the visibility of a streak caused by the defective nozzle.

It is preferable that the output data generation unit includes: a concentration equalization unit converting the gradation value of the image data, on the basis of information about a resolution lower than a recording resolution of the inkjet head, to equalize concentration in a second direction intersecting the first direction; a gradation-ink discharge amount conversion unit determining the amount of ink discharged which corresponds to the gradation value of the image data on the basis of the recording resolution of the inkjet head for each of the divided regions; and a halftone processing unit quantizing the image data to output data, which is represented by at least the first ink droplet and the second ink droplet, for each of the divided regions according to the amount of ink discharged. According to this structure, the gamma conversion process can be performed at the resolution lower than the recording resolution of the inkjet head and can also be performed at the recording resolution of the inkjet head. Therefore, it is possible to appropriately equalize concentration. In addition, it is possible to appropriately quantize the image data to output data which is represented by ink droplets with a plurality of sizes.

It is preferable that the concentration equalization unit converts the gradation value of the image data using a concentration equalization lookup table. According to this structure, it is possible to appropriately equalize concentration in the direction intersecting the first direction.

It is preferable that the image processing device according to the above-mentioned aspect of the invention further includes: a test chart read data acquisition unit acquiring test chart read data which is read from a test chart image recorded by the inkjet head; and a low-frequency unevenness correction processing unit updating the concentration equalization lookup table on the basis of the test chart read data and equalizing the concentration in the second direction.

According to this structure, it is possible to appropriately update the concentration equalization lookup table.

It is preferable that the gradation-ink discharge amount conversion unit determines the amount of ink discharged which corresponds to the gradation value converted by the concentration equalization lookup table, using an ink discharge amount conversion lookup table for each of the divided regions. According to this structure, even when the nozzles have different ink discharge amount characteristics, it is possible to appropriately determine the amount of ink discharged which corresponds to the nozzle.

The image data may be data which is recorded by inkjet heads of a plurality of colors and the output data generation unit may generate data for each inkjet head of a single color. According to this structure, even when inkjet heads of a plurality of colors are used to record an image on the recording medium, it is possible to appropriately reduce the visibility of a streak caused by the defective nozzle.

In order to achieve the object, according to another aspect of the invention, there is provided an inkjet recording device including: the image processing device; an inkjet head including a plurality of nozzles which can discharge at least the first ink droplet and the second ink droplet; a moving unit relatively moving the inkjet head and a recording medium in a first direction; and a controller performing control on the basis of output data generated by the image processing device such that ink droplets are discharged from the plurality of nozzles to record an image while relatively moving the inkjet head and the recording medium.

According to this aspect, it is possible to reduce the visibility of a streak caused by a defective nozzle, regardless of whether image data is in a high gradation range or a low gradation range.

In order to achieve the object, according to still another aspect of the invention, there is provided an image processing method including: a step of acquiring image data recorded by discharging ink droplets from a plurality of nozzles, which are provided in an inkjet head and can discharge at least a first ink droplet and a second ink droplet smaller than the first ink droplet, while relatively moving a recording medium and the inkjet head in a first direction; a defective nozzle specifying step of specifying a defective nozzle from the plurality of nozzles; a step of dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and a step of performing at least a gamma conversion process and halftone processing on the image data to generate output data. The output data generation step generates output data, in which a generation rate of the first ink droplet, a generation rate of the second ink droplet, and an amount of ink discharged per unit area vary depending on a gradation value of the image data, for each of the divided regions, and generates the following output data for image data with a first gradation value: the output data causes the defective nozzle not to discharge ink; the output data causes a fourth nozzle corresponding to the fourth pixel row to discharge a first amount of ink per unit area, using the generation rate of the first ink droplet as a first generation rate and the generation rate of the second ink droplet as a second generation rate; the output data causes the generation rate of the first ink droplet to be higher than the first generation rate and causes a second nozzle corresponding to the second pixel row to discharge a second amount of ink more than the first amount of ink per unit area; the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

According to this aspect, it is possible to reduce the visibility of a streak caused by a defective nozzle, regardless of whether image data is in a high gradation range or a low gradation range.

In order to achieve the object, according to yet another aspect of the invention, there is provided a non-transitory computer readable medium storing a program that causes a computer to perform an image processing method. The program includes: a function of acquiring image data recorded by discharging ink droplets from a plurality of nozzles, which are provided in an inkjet head and can discharge at least a first ink droplet and an ink droplet smaller than the first ink droplet, while relatively moving a recording medium and the inkjet head in a first direction; a defective nozzle specifying function of specifying a defective nozzle from the plurality of nozzles; a function of dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and a function of performing at least a gamma conversion process and halftone processing on the image data to generate output data. The output data generation function includes a function of generating output data, in which a generation rate of the first ink droplet, a generation rate of the second ink droplet, and an amount of ink discharged per unit area vary depending on a gradation value of the image data, for each of the divided regions, and generating the following output data for image data with a first gradation value: the output data causes the defective nozzle not to discharge ink; the output data causes a fourth nozzle corresponding to the fourth pixel row to discharge a first amount of ink per unit area, using the generation rate of the first ink droplet as a first generation rate and the generation rate of the second ink droplet as a second generation rate; the output data causes the generation rate of the first ink droplet to be higher than the first generation rate and causes a second nozzle corresponding to the second pixel row to discharge a second amount of ink more than the first amount of ink per unit area; the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

According to this aspect, it is possible to reduce the visibility of a streak caused by a defective nozzle, regardless of whether image data is in a high gradation range or a low gradation range.

According to the invention, it is possible to reduce the visibility of a streak caused by a defective nozzle, regardless of whether image data is in a high gradation range or a low gradation range.

BRIEF DESCRIPTION OF THE DRAWINGS

FIG. 4 is a diagram illustrating the visibility of a white streak at each gradation.

FIG. 16 is a diagram schematically illustrating the amount of ink discharged in each region.

DESCRIPTION OF THE PREFERRED EMBODIMENTS

Hereinafter, preferred embodiments of the invention will be described in detail with reference to the accompanying drawings.

<Occurrence of White Streaks>

Figure 1:
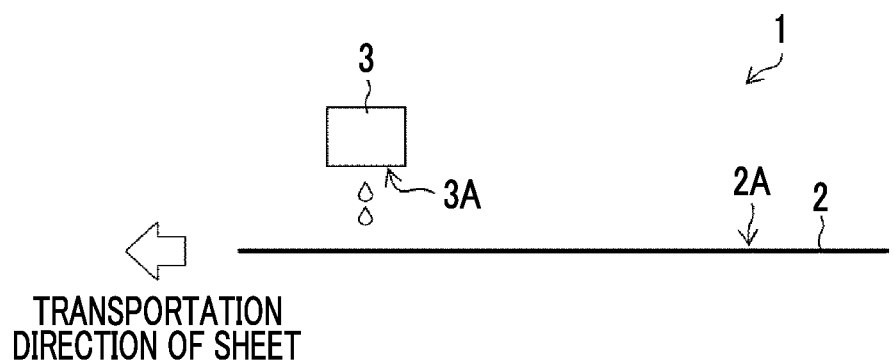
FIG. 1 is a schematic diagram illustrating an inkjet recording device.

FIG. 1 is a schematic diagram illustrating an inkjet recording device 1 according to this embodiment. As illustrated in FIG. 1, the inkjet recording device 1 is a single-pass-type line printer which forms an image on a recording surface 2A of a recording medium (sheet) 2 and includes a transportation unit (not illustrated) that transports the sheet 2 to the left side in FIG. 1 and an inkjet head 3 that records an image on the sheet 2.

The inkjet head 3 includes a plurality of nozzles which discharge ink droplets and are provided on a nozzle surface 3A facing the recording surface 2A of the sheet 2.

Figure 2:
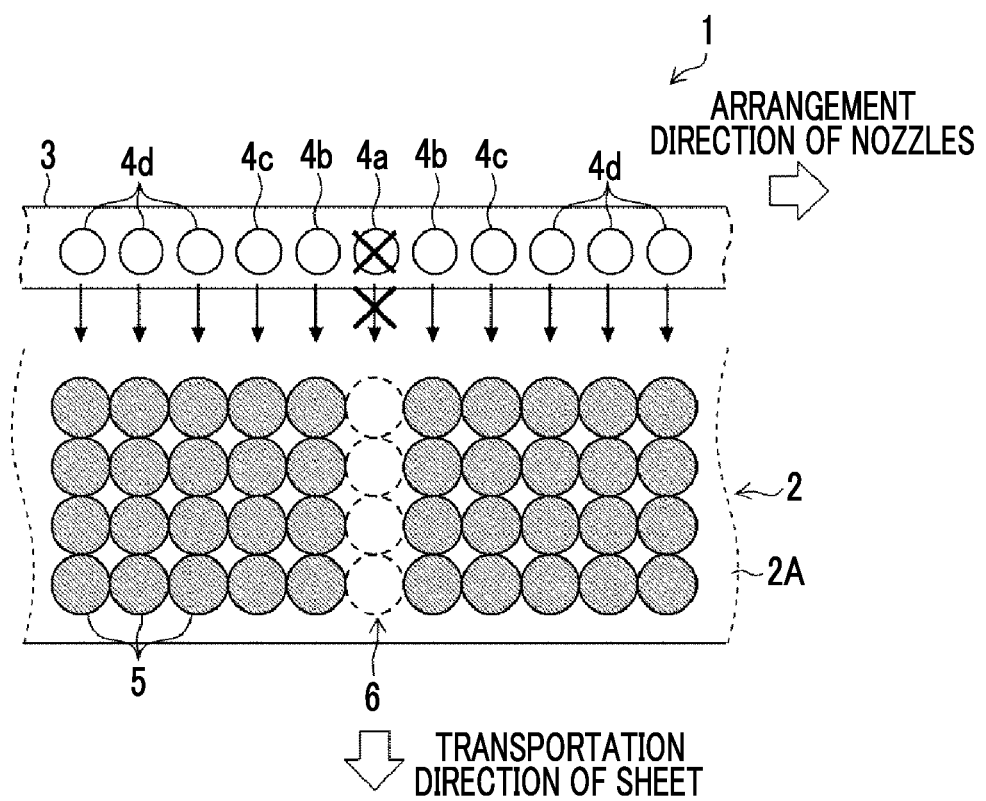
FIG. 2 is a diagram schematically illustrating the recording of an image in the inkjet recording device.

FIG. 2 is a diagram schematically illustrating the recording of an image in the inkjet recording device 1. FIG. 2 illustrates a plurality of nozzles 4 (4a to 4d) which are arranged on the nozzle surface 3a in a see-through manner and illustrates an aspect in which ink droplets 5 discharged from the nozzles 4a to 4d are landed on the sheet 2. As illustrated in FIG. 2, when there is a non-discharging nozzle 4a which does not discharge ink among the plurality of nozzles 4, a white streak 6 is formed in a region corresponding to the non-discharging nozzle 4a on the recording surface 2A.

<Basic Principle of Correction of Abnormal Nozzle>

FIGS. 3A to 3D are diagrams illustrating the basic principle of the correction of an abnormal nozzle (non-discharging nozzle) and illustrate the correction of the abnormal nozzle in a shadow region in which a gradation value is greater than a predetermined value (an example in which the gradation value is relatively large). In FIGS. 3A to 3D, squares on the upper side indicate pixels of an image and a letter in the square indicates the size of an ink droplet discharged to each pixel. In FIGS. 3A to 3D, the lower side indicates a visual concentration profile in the arrangement direction of the nozzles in the arrangement of the ink droplets illustrated on the upper side.

The nozzles of the inkjet head are configured so as to discharge ink droplets with different sizes and discharge at least a first ink droplet and a second ink droplet smaller than the first ink droplet. In this embodiment, the nozzles of the inkjet head are configured so as to discharge ink droplets with three types of size. In FIGS. 3A to 3D, S indicates a small droplet, M indicates a medium droplet relatively larger than the small droplet, and L indicates a large droplet relatively larger than the medium droplet. In addition, a blank square indicates a pixel to which no ink droplets are discharged.

Among the pixels illustrated on the upper side of each of FIGS. 3A to 3D, a region A arranged in the vertical direction of FIGS. 3A to 3D indicates a pixel row corresponding to the non-discharging nozzle 4a illustrated in FIG. 2, a region B arranged in the vertical direction of FIGS. 3A to 3D indicates a pixel row corresponding to the nozzles 4b illustrated in FIG. 2, a region C arranged in the vertical direction of FIGS. 3A to 3D indicates a pixel row corresponding to the nozzles 4c illustrated in FIG. 2, and a region D arranged in the vertical direction of FIGS. 3A to 3D indicates a pixel row corresponding to the nozzles 4d illustrated in FIG. 2.

Figure 3A:
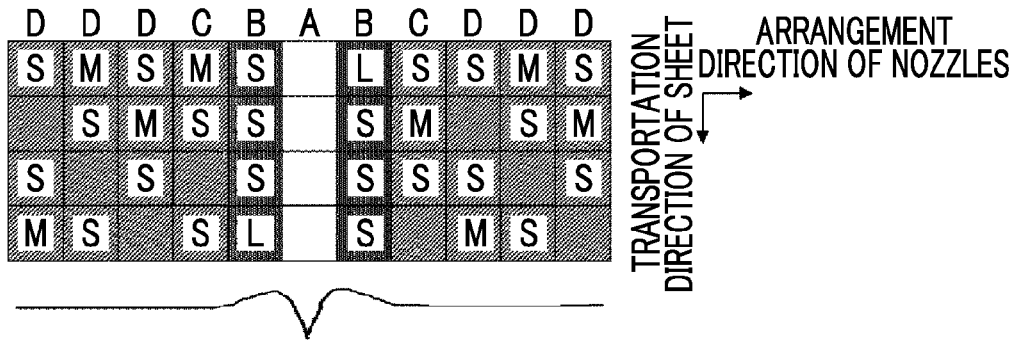
FIGS. 3A to 3D are diagrams illustrating the basic principle of the correction of an abnormal nozzle.

FIG. 3A illustrates an aspect in which the concentration of the region B is higher than the concentration of the regions C and D, with respect to the region A to which no ink droplets are discharged. When the ink droplets are arranged in this way, the average concentration of the regions A and B in the arrangement direction of the nozzles, [(the concentration of the region B+the concentration of the region A+the concentration of the region B)÷3], can be equal to the average concentration of the regions C and D. However, in this arrangement of the ink droplets, as illustrated on the lower side of FIG. 3A, a white streak is seen in the region A.

Figure 3B:
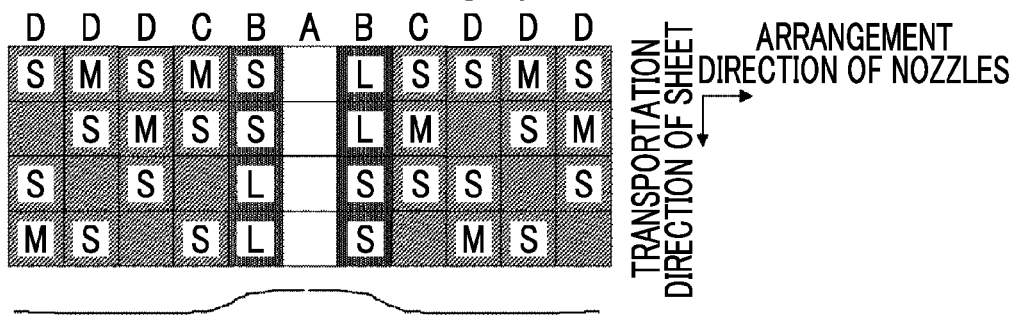

FIG. 3B illustrates an aspect in which some of the small droplets in the region B are changed to large droplets to increase the amount of ink in the region B, in order to suppress the occurrence of the white streak. In this case, as illustrated on the lower side of FIG. 3B, a black streak occurs at the present time.

Figure 3C:
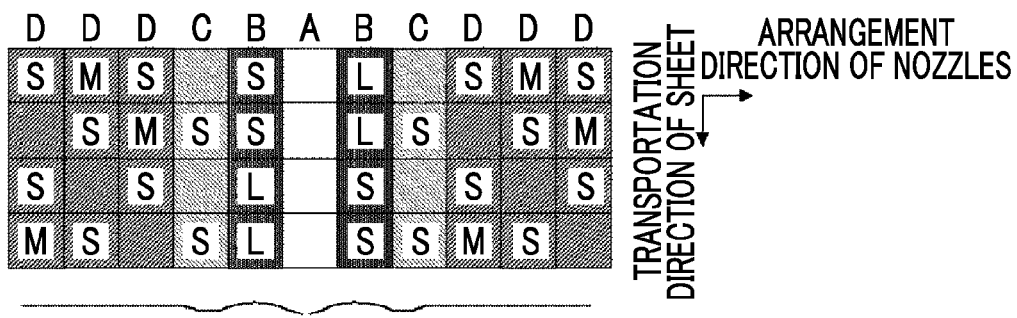

FIG. 3C illustrates an aspect in which the number of void pixels (pixels to which no ink droplets are discharged) increases to reduce the amount of ink in the region C in order to suppress the occurrence of the black streak. When the ink droplets are arranged in this way, the average concentration of the regions A, B, and C in the arrangement direction of the nozzles, [(the concentration of the region C+the concentration of the region B+the concentration of the region A+the concentration of the region B+the concentration of the region C)÷5], can be equal to the average concentration of the region D. However, since the image structure of the regions A to C is different from the image structure of the region D, banding is seen.

Figure 3D:
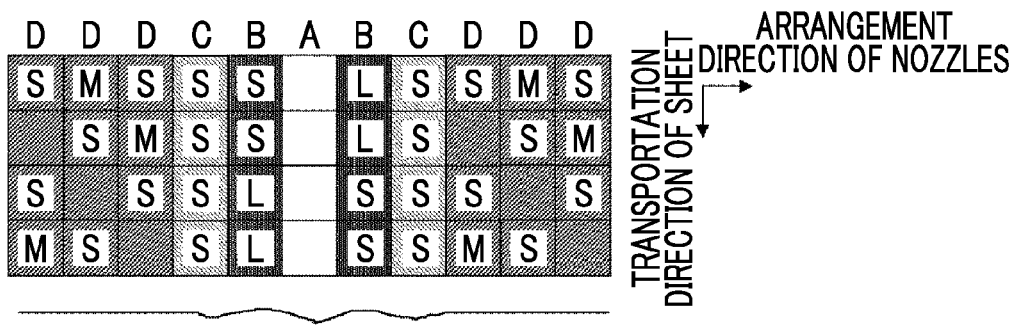

FIG. 3D illustrates an aspect in which the droplets discharged to the region C are changed to small droplets and no void pixels are provided, as compared to the aspect illustrated in FIG. 3B, in order to suppress the occurrence of the banding. When the ink droplets are arranged in this way, the average concentration of the regions A, B, and C in the arrangement direction of the nozzles can be equal to the average concentration of the region D and the image structure of the regions A to C can be the same as the image structure of the region D. Therefore, the visual concentrations are equal to each other and it is possible to suppress the occurrence of a white streak.

<Visibility of Streaks>

As such, it is necessary to perform correction on the non-discharging nozzle, considering the visibility of streaks. The visibility of the streaks is determined by the contrast of a void in the region corresponding to the non-discharging nozzle and shading and an image structure in the vicinity of the void. FIG. 4 illustrates the visibility of a white streak at each gradation.

As illustrated in FIG. 4, the shading of the void is less likely to be seen on the highlight (an example in which the gradation value is relatively small) side where the gradation value is less than a predetermined value. When a correction width increases, a streak is more likely to be seen. Therefore, it is preferable to correct only a region (the region B in FIGS. 3A to 3D) in the vicinity of the streak on the highlight side. Even when the void is not filled with ink by the non-discharging nozzle due to the correction of only the region in the vicinity of the streak, the void is not seen since contrast is low on the highlight side.

In contrast, on the shadow side, the void caused by the non-discharging nozzle is likely to be seen and needs to be filled. In order to fill the void, it is necessary to increase the amount of ink in the region (the region B in FIGS. 3A to 3D) in the vicinity of the streak and to use ink droplets with a relatively large size. In addition, since concentration is increased by a value corresponding to the increase in the amount of ink, it is necessary to reduce the concentration of a region (the region C in FIGS. 3A to 3D) adjacent to the region B and to reduce average concentration. As a result, the correction width increases, but shading is less likely to be seen, which causes no problems.

However, when the image structure is changed due to the reduction in concentration, a streak is seen. Here, the image structure on the shadow side is mainly the pattern of voids to which no ink is discharged. The image structure can be suppressed by using a large amount of small droplets and filling the voids while suppressing an increase in concentration. That is, on the shadow side, large droplets are discharged to form dots in the region (the region B in FIGS. 3A to 3D) in the vicinity of the streak and the amount of ink increases to fill the voids in an abnormal portion. In addition, a large amount of small droplets are discharged to the region (the region C in FIGS. 3A to 3D) in the vicinity of the region B and the amount of ink decreases to reduce the visibility of the streaks.

The visibility of the streaks changes continuously throughout the gradations. As such, the inventors conducted a thorough study and found that the visibility of the streaks changed continuously from the highlight side to the shadow side.

<Outline of Inkjet Recording Device>

Figure 5:
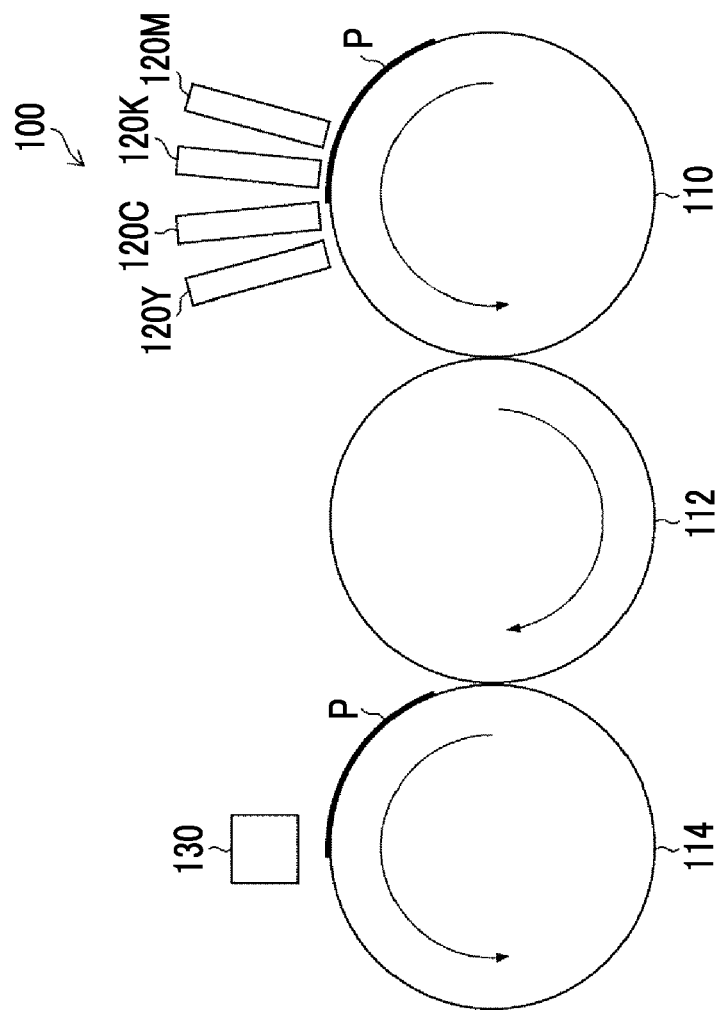
FIG. 5 is a side view schematically illustrating an inkjet recording device.

FIG. 5 is a schematic side view illustrating the inkjet recording device according to this embodiment. An inkjet recording device 100 is a single-pass-type line printer which forms an image on a recording surface of a sheet P (an example of a recording medium) and includes, for example, transportation drums 110, 112, and 114, line heads 120M, 120K, 120C, and 120Y, and an in-line sensor 130.

A plurality of suction holes (not illustrated) are formed in the transportation surfaces of the transportation drums 110, 112, and 114 (an example of a moving unit) in a predetermined pattern. The sheet P which is wound around the circumferential surfaces of the transportation drums 110, 112, and 114 is sucked by the suction holes and is transported while being drawn to and held by the circumferential surfaces of the transportation drums 110, 112, and 114.

A plurality of nozzles for discharging magenta ink (M ink), black ink (K ink), cyan ink (C ink), and yellow ink (Y ink) are formed in the surfaces of the four line heads 120M, 120K, 120C, and 120Y (an example of an inkjet head) which face the transportation drum 110 over the full width of the sheet P.

The line heads 120M, 120K, 120C, and 120Y discharge ink from each nozzle under the control of a control unit (not illustrated in FIG. 5) to form an image on the recording surface of the sheet P that is transported by the transportation drum 110 in the transportation direction of the sheet (an example of a first direction) which is the rotational direction of the transportation drum 110. As such, an image is formed on the entire recording surface of the sheet P by one transportation operation (single pass) of the transportation drum 110.

The sheet P having the recording surface on which the image has been formed by the line heads 120M, 120K, 120C, and 120Y is transported from the transportation drum 110 to the transportation drum 112 and is then transported from the transportation drum 112 to the transportation drum 114.

The in-line sensor 130 captures the image formed on the recording surface of the sheet P which is drawn to and held by the transportation drum 114.

The in-line sensor 130 is a device reading the image formed on the sheet P and detecting, for example, the concentration of the image and the deviation of the landing position of dots. For example, a CCD line sensor is used as the in-line sensor 130.

<Structure of Line Head>

Next, an example of the structure of the line head will be described. The line heads 120M, 120K, 120C, and 120Y have the same structure. Therefore, in the following description, it is assumed that the head represented by reference numeral 120 typifies the line heads.

Figure 6A:
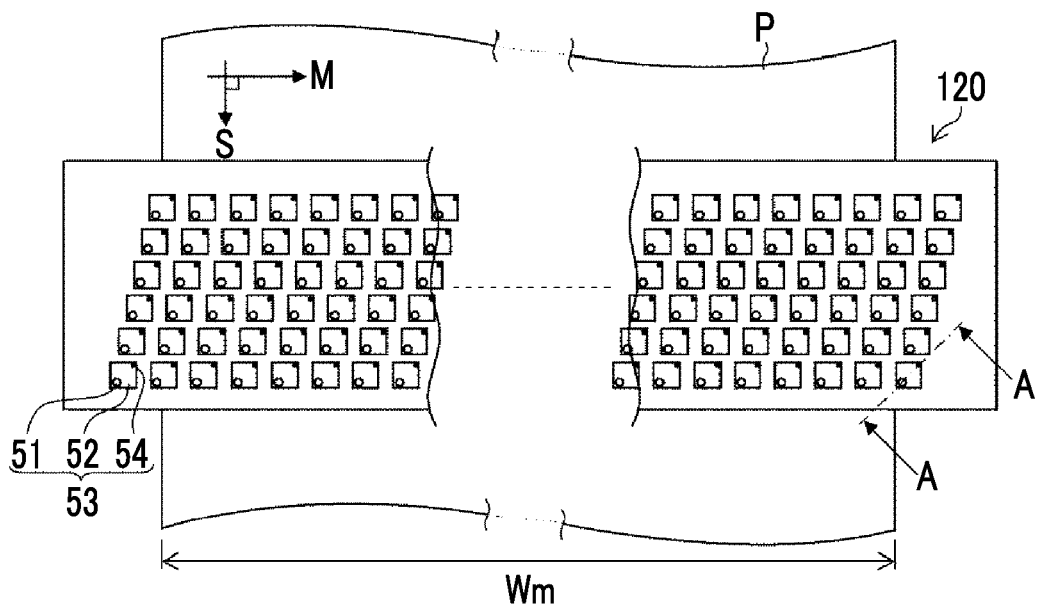
FIG. 6A is a perspective plan view illustrating an example of the structure of a line head and FIG. 6B is an enlarged view illustrating a part of the line head.
Figure 6B:
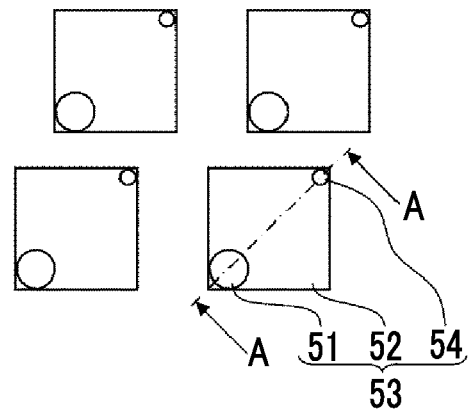
Figure 7:
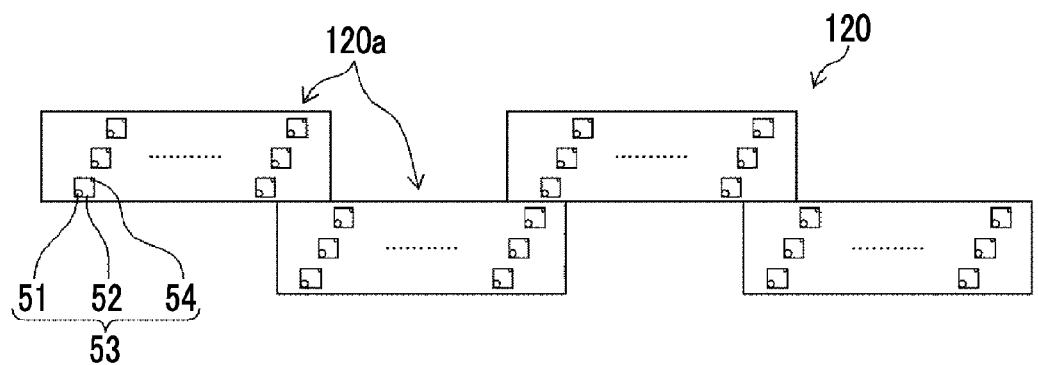
FIG. 7 is a perspective plan view illustrating another example of the structure of the line head.
Figure 8:
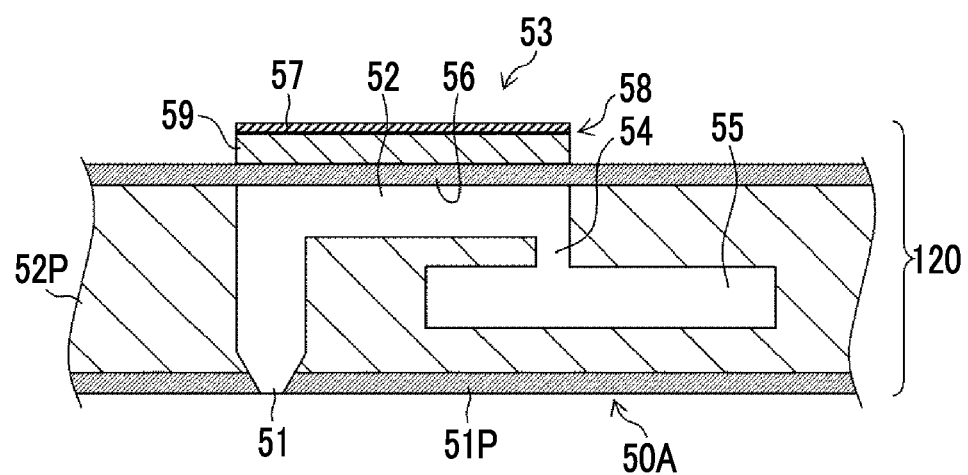
FIG. 8 is a cross-sectional view illustrating the stereoscopic structure of a droplet discharge element.

FIG. 6A is a perspective plan view illustrating an example of the structure of the line head 120. FIG. 6B is an enlarged view illustrating a part of the line head 120. FIG. 7 is a perspective plan view illustrating another example of the structure of the line head 120. FIG. 8 is a cross-sectional view (a cross-sectional view taken along line A-A of FIG. 6B) illustrating the stereoscopic configuration of a droplet discharge element (an ink chamber unit corresponding to one nozzle 51) for one channel which is a unit of a recording element.

As illustrated in FIGS. 6A and 6B, in the line head 120, a plurality of nozzles 51, which are ink discharge holes, are arranged over the full width of an image forming region of the nozzle surface of the line head 120 which faces the sheet P. According to this structure, the actual gap between the nozzles (projected nozzle pitch) which are projected (orthogonally projected) so as to be arranged in the longitudinal direction of the head (a direction orthogonal to the transportation direction of the sheet P) is reduced and the density of the nozzles increases.

The structure in which a nozzle row with a length equal to or greater than the full width Wm of the sheet P is formed in the direction (the direction of an arrow M; a main scanning direction) substantially orthogonal to the transportation direction of the sheet P (the direction of an arrow S; a sub-scanning direction) is not limited to this example. For example, instead of the structure illustrated in FIG. 6A, short head modules 120a in which a plurality of nozzles 51 are two-dimensionally arranged may be arranged and connected in a staggered pattern to form the line head 120 having a nozzle row with a length corresponding to the full width of the sheet P, as illustrated in FIG. 7.

Each pressure chamber 52 which is arranged so as to correspond to each nozzle 51 has a substantially square shape in a plan view (see FIGS. 6A and 6B). An outlet to the nozzle 51 is provided at one of two corners on a diagonal line of the pressure chamber and an inlet (supply port) 54 for supplying ink is provided at the other corner thereof. The shape of the pressure chambers 52 is not limited to this example and the pressure chambers 52 may have various shapes in a plan view, such as a quadrilateral shape (for example, a rhombic shape or a rectangular shape, or the like), a pentagonal shape, a hexagonal shape, other polygonal shapes, a circular shape, and an elliptical shape.

As illustrated in FIG. 8, the line head 120 has a structure in which, for example, a nozzle plate 51P, a flow path plate 52P, and a diaphragm 56 are laminated and bonded. The nozzle plate 51P forms a nozzle surface 50A of the line head 120 and a plurality of nozzles 51 which are connected to each pressure chamber 52 are two-dimensionally formed in the nozzle plate 51P.

The flow path plate 52P is a flow path forming member which forms a side wall portion of the pressure chamber 52 and forms the supply port 54 as a restricting portion (narrowest portion) of an individual supply path for guiding ink from a common flow path 55 to each pressure chamber 52. For convenience of explanation, the structure of the line head 120 is simply illustrated in FIG. 8. However, the flow path plate 52P is one substrate or a laminate of a plurality of substrates.

The diaphragm 56 forms one wall surface of the pressure chamber 52 (the upper surface in FIG. 8) and is made of a conductive material, such as stainless steel (SUS) or silicon (Si) with a nickel (Ni) conductive layer. The diaphragm 56 also functions as an electrode common to a plurality of actuators (here, piezoelectric elements) 58 which are provided so as to correspond to each pressure chamber 52. In addition, the diaphragm 56 may be made of a non-conductive material such as a resin. In this case, a common electrode layer which is made of a conductive material, such as metal, is formed on the surface of the diaphragm member.

A piezoelectric body 59 is provided on a surface (the upper surface of FIG. 8) of the diaphragm 56 which is opposite to the pressure chamber 52 at a position corresponding to each pressure chamber 52. An individual electrode 57 is formed on the upper surface (a surface opposite to the surface that comes into contact with the diaphragm 56 which also functions as a common electrode) of the piezoelectric body 59. The individual electrode 57, the common electrode (which also functions as the diaphragm 56 in this example) that is opposite to the individual electrode 57, and the piezoelectric body 59 that is interposed between the electrodes form a piezoelectric element that functions as an actuator 58. The piezoelectric body 59 is appropriately made of a piezoelectric material such as lead zirconate titanate or barium titanate.

Each pressure chamber 52 is connected to the common flow path 55 through the supply port 54. The common flow path 55 is connected to an ink tank (not illustrated) which is an ink supply source and ink supplied from the ink tank is distributed and supplied to each pressure chamber 52 through the common flow path 55.

When a driving voltage is applied between the common electrode and the individual electrode 57 of the actuator 58, the actuator 58 is deformed and the volume of the pressure chamber 52 is changed. Then, ink is discharged from the nozzles 51 due to a change in pressure. When the actuator 58 returns to the original position after the ink is discharged, new ink is supplied from the common flow path 55 to the pressure chamber 52 through the supply port 54 and fills the pressure chamber 52 again.

Figure 9:
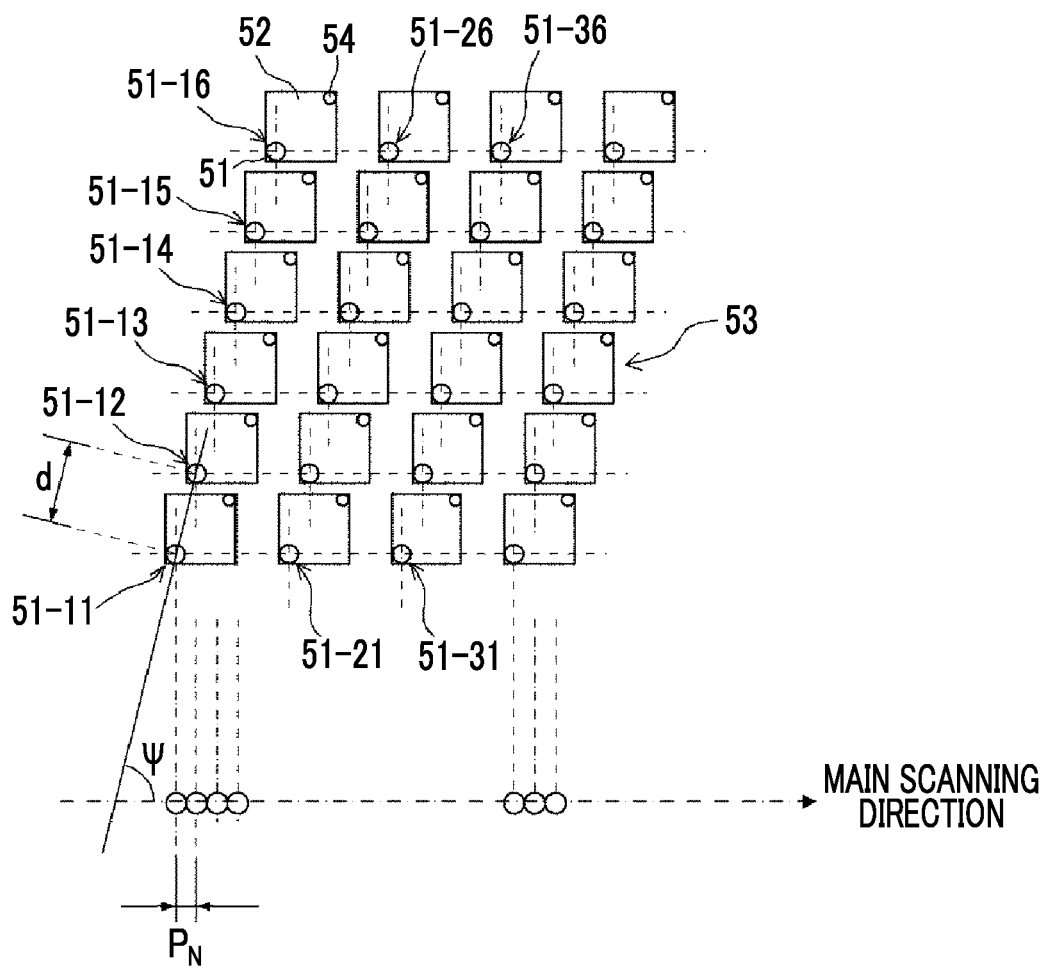
FIG. 9 is a diagram illustrating the matrix arrangement of nozzles.

As illustrated in FIG. 9, a plurality of ink chamber units 53 having the above-mentioned structure are arranged at predetermined pitches d in the direction of an angle $\psi$ with respect to the main scanning direction. In practice, this structure can be treated equivalently to a structure in which the nozzles 51 are linearly arranged in the main scanning direction at a predetermined pitch $P_N$ ($=d \times \cos \psi$).

In the matrix arrangement of the nozzles illustrated in FIG. 9, nozzles 51-11, 51-12, 51-13, 51-14, 51-15, and 51-16 form one block (alternatively, nozzles 51-21, . . . , 51-26 form one block, nozzle 51-31, . . . , 51-36 form one block, . . . ) and the nozzles 51-11, 51-12, . . . , 51-16 are sequentially driven according to the transportation speed of the recording medium to print one line in the width direction of the sheet P.

Here, for example, nozzles adjacent to the nozzle 51-13 are the nozzle 51-12 and the nozzle 51-14. As such, in this embodiment, adjacent nozzles mean nozzles which discharge ink droplets to positions that are adjacent to each other in the main scanning direction.

With the transportation of the sheet P, the printing of one line by the above-mentioned main scanning process (a line formed by one row of dots or a line formed by a plurality of rows of dots) is repeatedly performed in the transportation direction of the sheet P to perform printing in the sub-scanning direction.

In this embodiment, the arrangement of the nozzles 51 in the line head 120 is not limited to the example illustrated in the drawings. The nozzles may be arranged in various patterns, instead of the matrix arrangement illustrated in FIGS. 6A and 6B. For example, the nozzles can be arranged in a straight line shape, a V-shape, and a polygonal line shape such as a zigzag (for example, a W-shape) pattern in which the V-shaped pattern is repeated.

In this embodiment, the method (piezo jet method) in which the actuator typified by the piezoelectric element (piezo element) is deformed to discharge the ink droplets is used. However, in the invention, the ink discharge method is not particularly limited. Various methods may be used, instead of the piezo jet method. For example, a thermal jet method can be used which heats ink using a heating body, such as a heater, to generate air bubbles and discharges ink droplets using the pressure of the air bubbles.

<Electrical Structure of Inkjet Recording Device>

Figure 10:
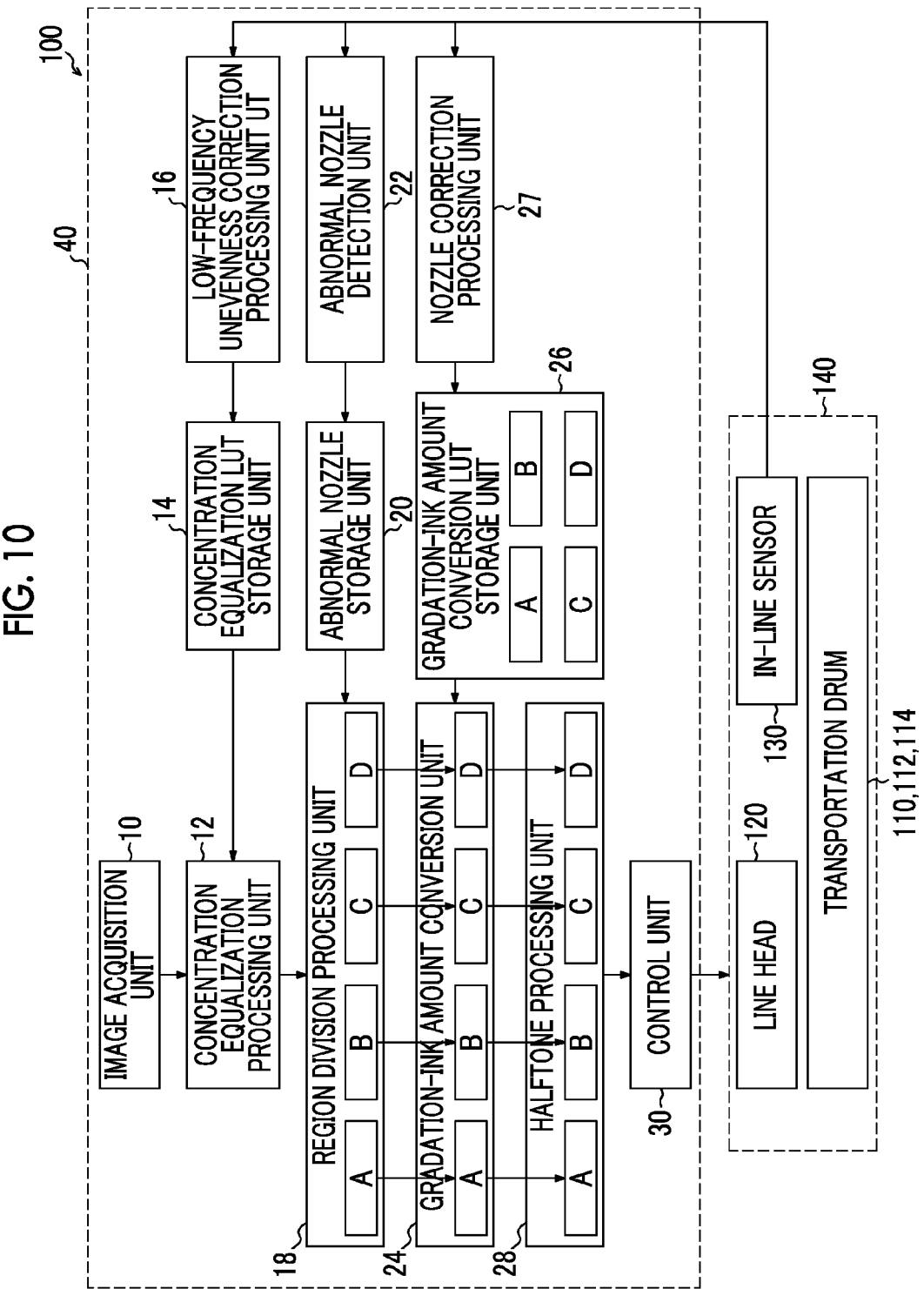
FIG. 10 is a block diagram illustrating the electrical structure of the inkjet recording device.

FIG. 10 is a block diagram illustrating the electrical structure of the inkjet recording device 100. As illustrated in FIG. 10, the inkjet recording device 100 includes an image processing unit 40 (an example of an image processing device) including, for example, an image acquisition unit 10, a concentration equalization processing unit 12, a region division processing unit 18, a gradation-ink amount conversion unit 24, a halftone processing unit 28, and a control unit 30, in addition to an image recording unit 140 including the transportation drums 110, 112, and 114, the line head 120, and the in-line sensor 130.

The image acquisition unit 10 (an example of an image data acquisition unit) includes a wired or wireless input interface and acquires image data to be recorded by the line head 120.

The concentration equalization processing unit 12 (an example of a concentration equalization unit) performs a concentration equalization process (an example of a gamma conversion process) on the image data acquired by the image acquisition unit 10 to equalize concentration in a direction (an example of a direction intersecting the first direction) orthogonal to the transportation direction of the sheet. The concentration equalization process is performed using a concentration equalization lookup table (LUT) stored in a concentration equalization LUT storage unit 14.

The concentration equalization LUT is generated by a low-frequency unevenness correction processing unit 16 (an example of a low-frequency unevenness correction processing unit). The low-frequency unevenness correction processing unit 16 acquires the concentration profile of a test chart of a screen tint image (a solid image with constant concentration) which has been recorded on the recording surface of the sheet P by the line head 120, calculates concentration characteristics of each nozzle, and generates the concentration equalization LUT from the concentration characteristics of the nozzles using reverse conversion.

The region division processing unit 18 (an example of a division unit) divides the region of the image data which has been subjected to the concentration equalization process by the concentration equalization processing unit 12 on the basis of abnormal nozzle information stored in an abnormal nozzle storage unit 20 (an example of a defective nozzle specifying unit). The division of the region will be described in detail below.

The abnormal nozzle information stored in the abnormal nozzle storage unit 20 is acquired by an abnormal nozzle detection unit 22. Here, an abnormal nozzle (defective nozzle) indicates a non-discharging nozzle or a nozzle which discharges ink in an incorrect direction. The abnormal nozzle (defective nozzle) is a defective nozzle which is not capable of discharging ink or discharges ink in a curved line and is a nozzle which is not capable of discharging ink normally.

The gradation-ink amount conversion unit 24 (an example of a gradation-discharge ink amount conversion unit) performs a gradation-ink amount conversion process (an example of a gamma conversion process) on each region of the image data subjected to the region division process. The gradation-ink amount conversion process is performed on the basis of a gradation-ink amount conversion LUT stored in a gradation-ink amount conversion LUT storage unit 26. This process will be described in detail below.

The nozzle correction processing unit 27 generates the gradation-ink amount conversion LUT, updates the gradation-ink amount conversion LUT, and stores the gradation-ink amount conversion LUT in the gradation-ink amount conversion LUT storage unit 26.

The halftone processing unit 28 (an example of a halftone processing unit) performs halftone processing on each region of the image data subjected to the ink amount conversion process. The halftone processing converts data with a large number of gradations into data with the number of gradations which can be recorded by the line head 120. In this embodiment, the halftone processing converts the image data into four gradations, such as a large droplet (an example of a first ink droplet), a medium droplet, a small droplet (an example of a second ink droplet), and no droplet. The halftone processing unit 28, the concentration equalization processing unit 12, and the gradation-ink amount conversion unit 24 form an output data generation unit.

The control unit 30 (an example of a controller) controls the line head 120 on the basis of the image data having each region subjected to the halftone processing such that an image is recorded on the sheet P.

<Abnormal Nozzle Correction Process>

Figure 11:
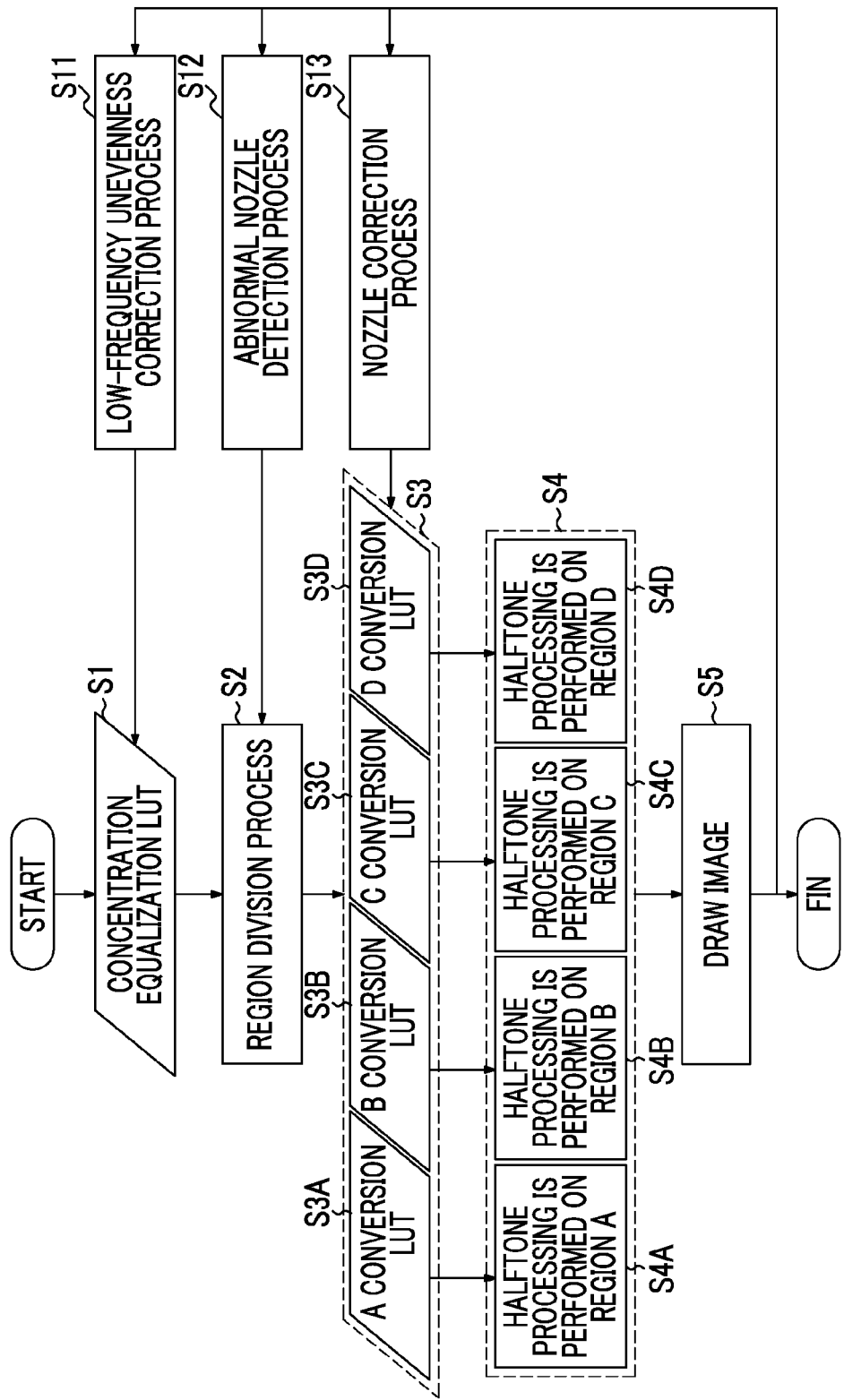
FIG. 11 is a flowchart illustrating an abnormal nozzle correction process.

FIG. 11 is a flowchart illustrating an abnormal nozzle correction process according to this embodiment. Here, a process of correcting the abnormal nozzle in the head of one color will be described.

(Step S1)

First, the image acquisition unit 10 acquires image data (an example of an image data acquisition step). Here, four-color image data corresponding to the line heads 120M, 120K, 120C, and 120Y of each color is acquired. Processing on image data corresponding to one color will be described in Steps S1 to S4. The same processing may be performed on image data corresponding to the other three colors.

The concentration equalization processing unit 12 performs the gamma conversion process on each nozzle 51 in order to suppress low-frequency unevenness unique to, for example, the line head 120 in the image data acquired by the image acquisition unit 10 (an example of a concentration equalization step and an output data generation step). In this case, it is assumed that the corrected concentration unevenness is less than the recording resolution of the line head 120.

(Step S2)

Then, the region division processing unit 18 divides the image data subjected to the concentration conversion process into the following regions A to D on the basis of the abnormal nozzle information (an example of a division step).

That is, it is assumed that a pixel row which corresponds to the abnormal nozzle and is arranged in the transportation direction of the sheet is the region A (first pixel row), pixel rows (pixel rows on both sides of the region A) which are adjacent to the region A are the region B (second pixel row), a pixel row which is adjacent to the side of the region B opposite to the region A is region C (third pixel row), and a region which does not correspond to any of the region A, region B, and the region C is the region D (fourth pixel row).

(Step S3)

The gradation-ink amount conversion unit 24 applies the gradation-ink discharge amount conversion LUT (an A conversion LUT, a B conversion LUT, a C conversion LUT, and a D conversion LUT) to the image data of each of the regions A to D divided in Step S2 to perform gradation-ink discharge amount conversion on each region (an example of a gradation-ink discharge amount conversion step and an output data generation step).

Figure 12:
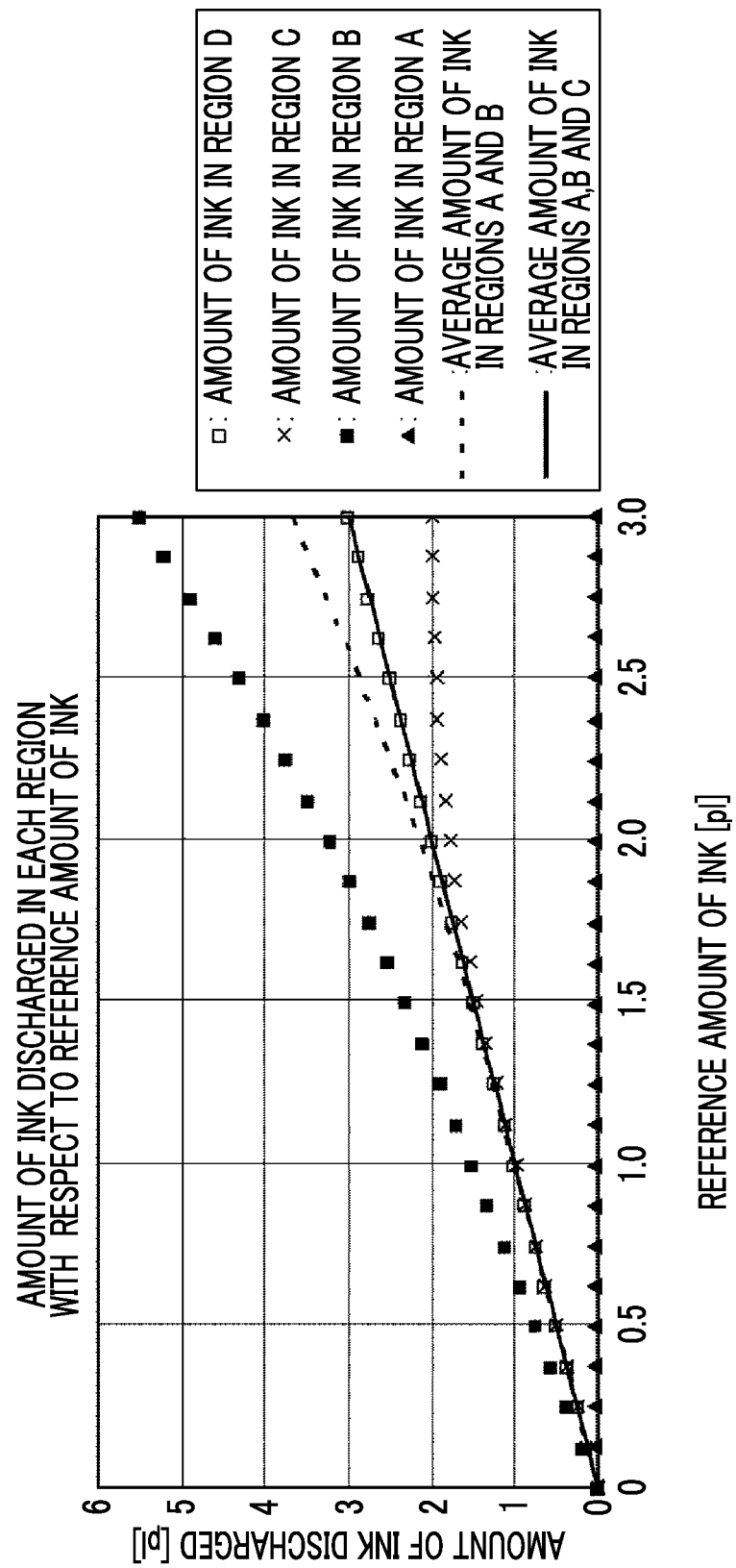
FIG. 12 is a diagram illustrating a conversion table for each region.

FIG. 12 illustrates the gradation-ink discharge amount conversion LUT, in which an input gradation is the reference amount of ink and the amount of ink which is output is the amount of ink discharged, for each region. In FIG. 12, the horizontal axis is an input and the vertical axis is an output. The unit of each of the horizontal axis and the vertical axis is pl (picoliters).

As illustrated in FIG. 12, in the region A, the amount of ink is constantly zero since the abnormal nozzle is masked (non-discharge process) (Step $S3_A$). The region D is separated from the region A corresponding to the abnormal nozzle and is a normal region on which the abnormal nozzle correction process is not performed and which performs recording normally. Therefore, in the region D, the amount of ink discharged is equal to the reference amount of ink (an example of the first amount of ink) (Step $S3_D$).

Since the amount of ink in the region A adjacent to the region B is zero, it is necessary to fill the void of the region A. Therefore, the amount of ink used in the region B increases, as compared to the region D which is a normal region (an example of the second amount of ink) (Step $S3_B$). The ratio of the increase in the amount of ink continuously changes and increases toward the shadow side.

In contrast, on the highlight side (a region in which the amount of ink is less than 2 pl per pixel as a guide), the amount of ink in the region C is equal to the amount of ink in the region D, that is, the reference amount of ink in order to narrow the correction width. On the shadow side, the amount of ink in the region C is reduced by a value corresponding to the increase in the amount of ink in the region B, as compared to the region D which is a normal region (an example of the third amount of ink) (Step $S3_C$). The ratio of the reduction in the amount of ink continuously changes and increases toward the shadow side.

In this case, when the average amount of ink (the amount of ink per unit area) in the region A is $V_{AVG}A$, the average amount of ink in the region B is $V_{AVG}B$, the average amount of ink in the region C is $V_{AVG}C$, and the average amount of ink in the region D is $V_{AVG}D$, the average amount of ink $V_{AVG}ABC$ in all of the regions A, B, and C satisfies the following Expression 1 at all gradations:

$$V_{AVG}ABC=(V_{AVG}A+2V_{AVG}B+2V_{AVG}C)/5=V_{AVG}D \quad \text{[Expression 1]}$$

(where $V_{AVG}A=0$).

As such, according to this structure in which the average amount of ink in all of the regions A, B, and C is equal to the average amount of ink in the region D at all gradations, it is possible to maintain the same concentration as that in the neighboring regions even when droplets are discharged in a mixed color (a plurality of colors).

The average amount of ink $V_{AVG}AB$ in the region A and the region B satisfies the following Expressions 2 and 3:

$$V_{AVG}AB=(V_{AVG}A+2V_{AVG}B)/3=2V_{AVG}B/3=V_{AVG}D$$
(highlight side); and [Expression 2]

$$V_{AVG}AB=(V_{AVG}A+2V_{AVG}B)/3=2V_{AVG}B/3>V_{AVG}D$$
(shadow side). [Expression 3]

According to this structure in which the average amount of ink in the regions A and B is equal to the average amount of ink in the region D on the highlight side, it is possible to maintain the same concentration as that in the neighboring regions even when colors are mixed while the correction width is narrowed. In addition, the average amount of ink in the regions A and B, that is, the average amount of ink in the region B increases on the shadow side to fill the voids of the region A.

Here, the A conversion LUT to the D conversion LUT are fixed lookup tables having the relationship of Expression 1 as a constraint condition, but the gradation-ink discharge amount conversion process is not limited to a process using the fixed LUT. For example, it is possible to preferably use the method disclosed in JP2012-45831A. That is, the correction candidate values of the non-discharging nozzle may be output as a test chart and a correction value may be determined on the basis of information on the correction candidate values. Among the candidate values, a candidate value satisfying the relationship of Expression 1 can be used to perform the gradation-ink discharge amount conversion process.

In this case, the A conversion LUT to the D conversion LUT which are fixed as initial values are used and a plurality of test charts are output while only the B conversion LUT is changed. Then, the B conversion LUT having the most equalized concentration is selected on the basis of data (test chart read data) read from the plurality of test charts. In this way, the B conversion LUT can be updated. In this case, the test chart can be read by a sensor with a resolution lower than the recording resolution of the line head 120. The same process as described above can be performed on the C conversion LUT to update the B conversion LUT and the C conversion LUT using the sensor with a resolution lower than the recording resolution. That is, it is possible to perform correction at the recording resolution using a sensor with a reading resolution lower than the recording resolution.

(Step S4)

Then, the halftone processing unit 28 performs the halftone processing on the image data, which has been converted into the amount of ink discharged in Step S3, for each region (an example of a halftone processing step and an output data generation step). In this embodiment, an example in which the image data is converted into four halftone data items, that is, 2 pl of small droplets (S size) discharged, 4 pl of medium droplets (M size) discharged, 6 pl of large droplets (L size) discharged, and no droplets (the amount of droplets discharged is 0 pl) will be described.

In the halftone processing, the image data of each region is quantized so as to satisfy the amount of ink discharged which is converted in Step S3. In this case, the total amount of ink discharged is represented by the amount of each droplet $V_i$ discharged and the generation rate $R_i$ of each droplet per unit area as follows:

$$V = \sum_i V_i R_i \quad \text{[Expression 4]}$$

Here, i indicates a droplet size (S, M, L) and $V_S=2$ [pl/px], $V_M=4$ [pl/px], and $V_L=6$ [pl/px] are established.

Figure 13A:
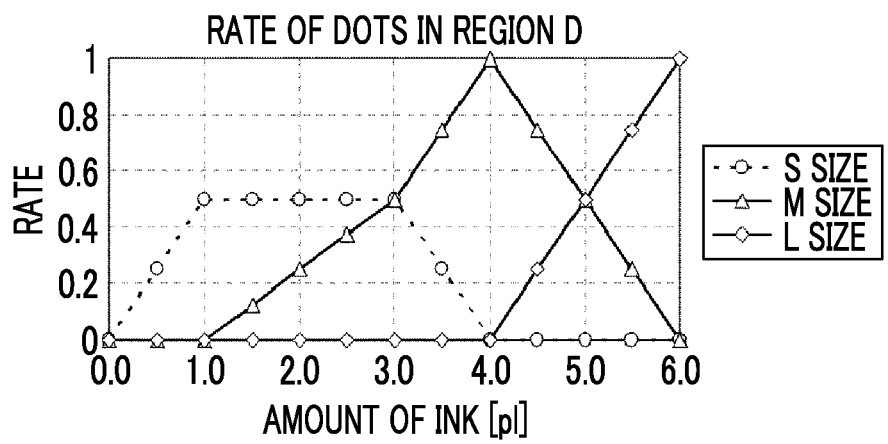
FIG. 13A is a diagram illustrating the generation rate of each droplet in a region D.
Figure 13B:
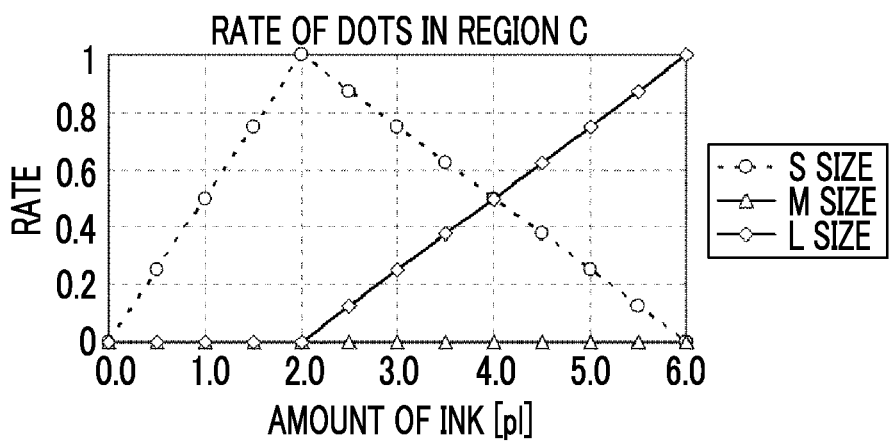
FIG. 13B is a diagram illustrating the generation rate of each droplet in a region C.
Figure 13C:
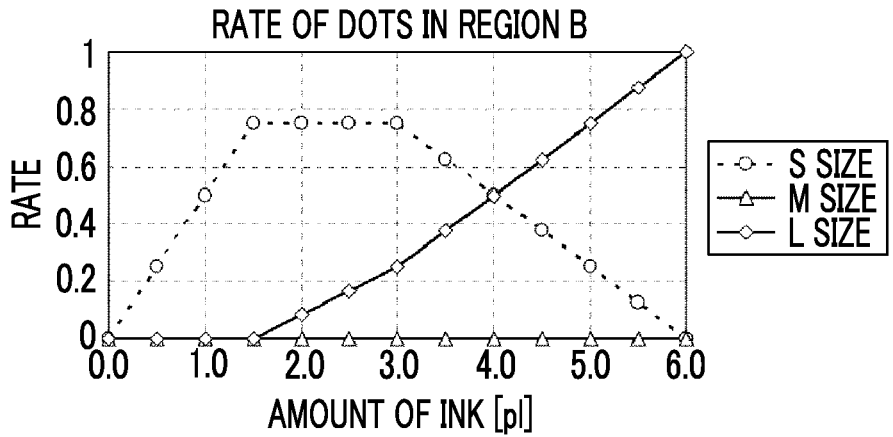
FIG. 13C is a diagram illustrating the generation rate of each droplet in a region B.

FIGS. 13A to 13C are diagrams illustrating the generation rates of the large droplet, the medium droplet, and the small droplet with respect to the amount of ink discharged for each region. FIG. 13A illustrates the generation rate of each droplet in the region D, FIG. 13B illustrates the generation rate of each droplet in the region C, and FIG. 13C illustrates the generation rate of each droplet in the region B. As such, the generation rate of each droplet with respect to the amount of ink discharged is set such that characteristics are different for each region.

Figure 14A:
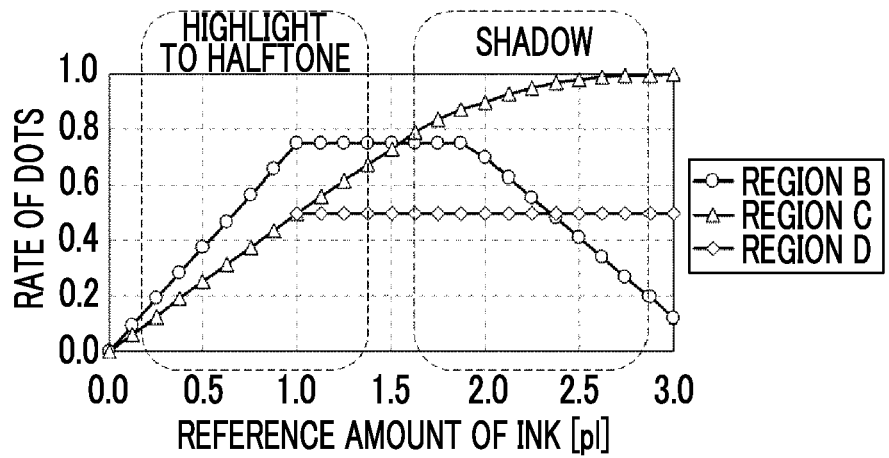
FIG. 14A is a diagram illustrating the generation frequency of a small droplet in each region.
Figure 14B:
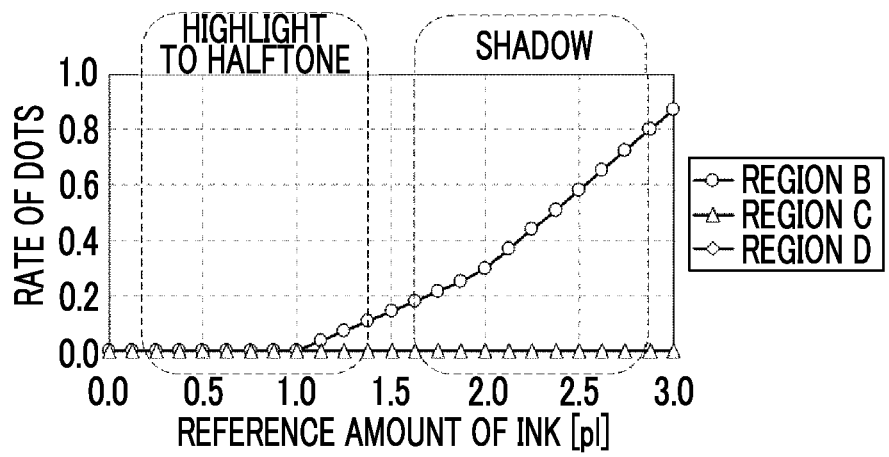
FIG. 14B is a diagram illustrating the generation frequency of a large droplet in each region.
Figure 14C:
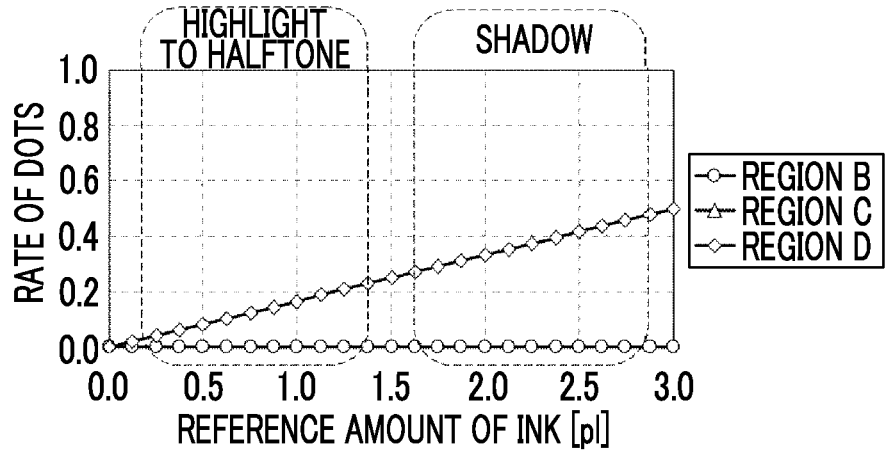
FIG. 14C is a diagram illustrating the generation frequency of a medium droplet in each region.

FIGS. 14A to 14C are diagrams illustrating the generation frequency of droplets for each region with respect to the reference amount of ink which is input for each droplet size. FIG. 14A illustrates the generation rate of the small droplets in each region, FIG. 14B illustrates the generation rate of the large droplets in each region, and FIG. 14C illustrates the generation rate of the medium droplets in each region.

FIG. 14A illustrates the generation rate of the small droplets in each region. As illustrated in FIG. 14A, for the generation rate of the small droplets, the generation rate of the small droplets in the C region is higher than the generation rate of the small droplets in the region D on the shadow side (the amount of droplets discharged per pixel is equal to or greater than 2 pl as a guide).

FIG. 14B illustrates the generation rate of the large droplets in each region. As illustrated in FIG. 14B, the large droplets are used only on the shadow side of the region B. It is possible to fill the voids of the region A with the large droplets.

FIG. 14C illustrates the generation rate of the medium droplets in each region. As illustrated in FIG. 14C, the medium droplets are used only in the region D in this embodiment.

It is possible to perform the halftone processing on each region using the existing technique, such as a multi-value dither matrix or a multi-value error diffusion method.

Therefore, since the amount of ink in the region A is constantly zero, no droplets are ever discharged to the region A (Step $S4_A$). Since the region D is a normal region, normal halftone processing is performed on the region D and the generation rates of the large droplet, the medium droplet, the small droplet, and no droplet are equal to a normal generation rate (an example of a first generation rate and a second generation rate) (Step $S4_D$).

Since no ink droplets are arranged in the region A adjacent to the region B, it is necessary to fill the voids of the region A. Therefore, the generation rate of the large droplet in the region B is higher than that in the region D which is a normal region (Step $S4_B$). The rate of increase in the generation rate of the large droplet continuously changes and increases toward the shadow side.

In contrast, on the highlight side (a region in which the amount of ink per pixel is less than 2 pl as a guide), the generation rates of the large droplet, the medium droplet, the small droplet, and no droplet in the region C are the same as those in the region D in order to narrow the correction width. On the shadow side, the generation rate of the small droplet is increased by a value corresponding to the increase in the generation rate of the large droplet in the region B, as compared to the region D which is a normal region (Step $S4_C$). When the rate of increase in the small droplet continuously changes and increases toward the shadow side (Step S5).

The process from Step S1 to Step S4 is performed on the image data of each color corresponding to the line heads 120M, 120K, 120C, and 120Y of each color.

As such, the control unit 30 controls the image recording unit 140 on the basis of the image data of each color which has been subjected to the halftone processing (an example of a control step). Therefore, ink is discharged from the nozzles 51 of the line heads 120M, 120K, 120C, and 120Y of each color and a mixed color image is recorded on the sheet P.

Figure 15:
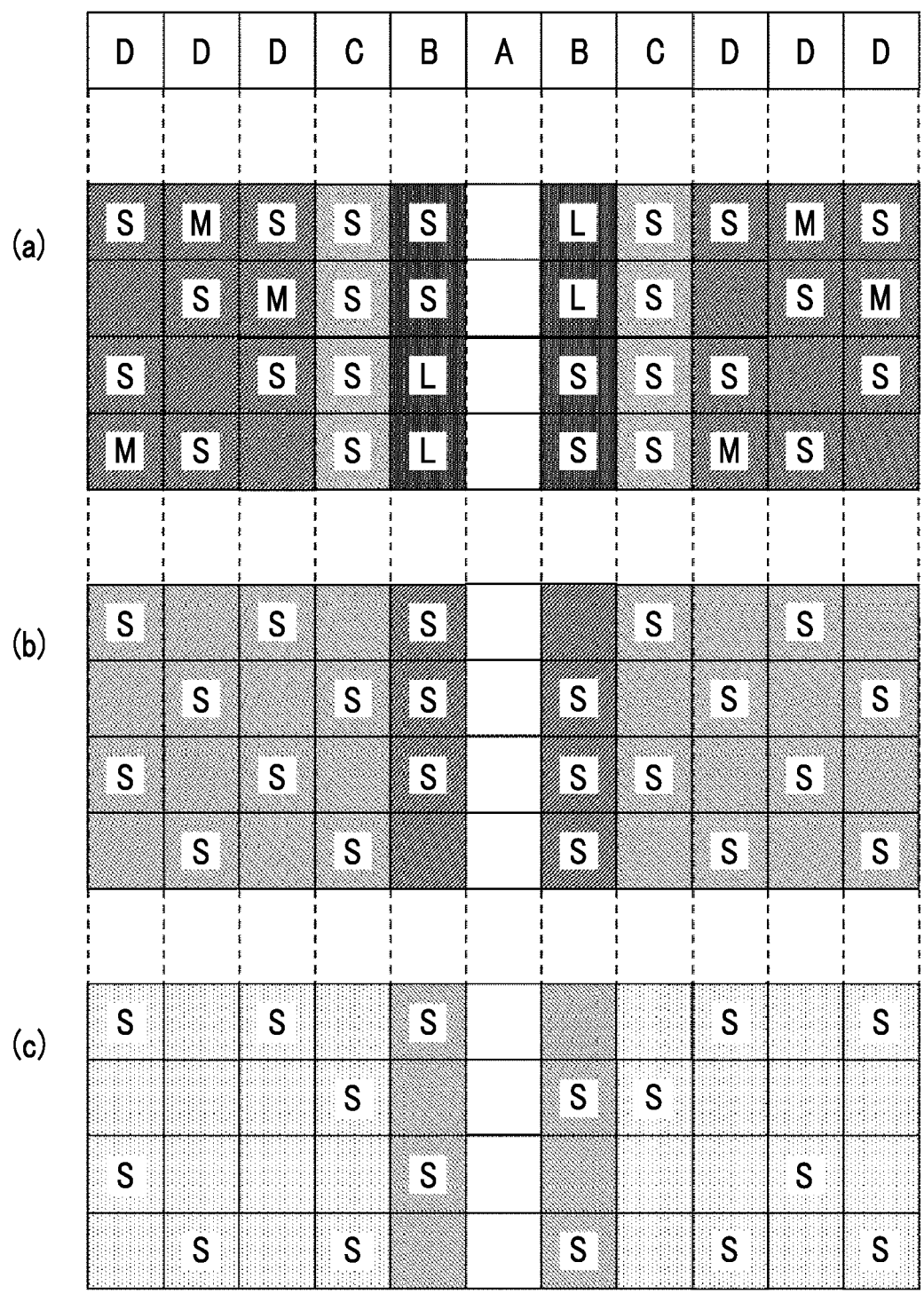
FIG. 15 is a diagram schematically illustrating the amount of ink discharged in each region.

FIGS. 15A to 15C are diagrams schematically illustrating the amount of ink discharged to each region by the head of one color in the image recorded on the sheet P in this embodiment. FIG. 15A illustrates a shadow image, FIG. 15B illustrates a halftone image, and FIG. 15C illustrates the amount of ink in the highlight image.

In FIGS. 15A to 15C, the region D is a normal region and the region A is a region which corresponds to the non-discharging nozzle and in which no ink droplets are discharged. The amount of ink discharged to the region B adjacent to the region A is more than the amount of ink discharged to the region D which is a normal region. The rate of increase in the amount of ink discharged increases toward the shadow side.

In the shadow image, the amount of ink discharged to the region C adjacent to the region B is less than the amount of ink discharged to the region D. The rate of decrease in the amount of ink discharged increases toward the shadow side.

In contrast, in the halftone image and the highlight image, the amount of ink in the region C is equal to the amount of ink in the region D.

As such, the average amount of ink in the regions A, B, C, and D is controlled so as to satisfy (Expression 1) to (Expression 3).

Figure 16:
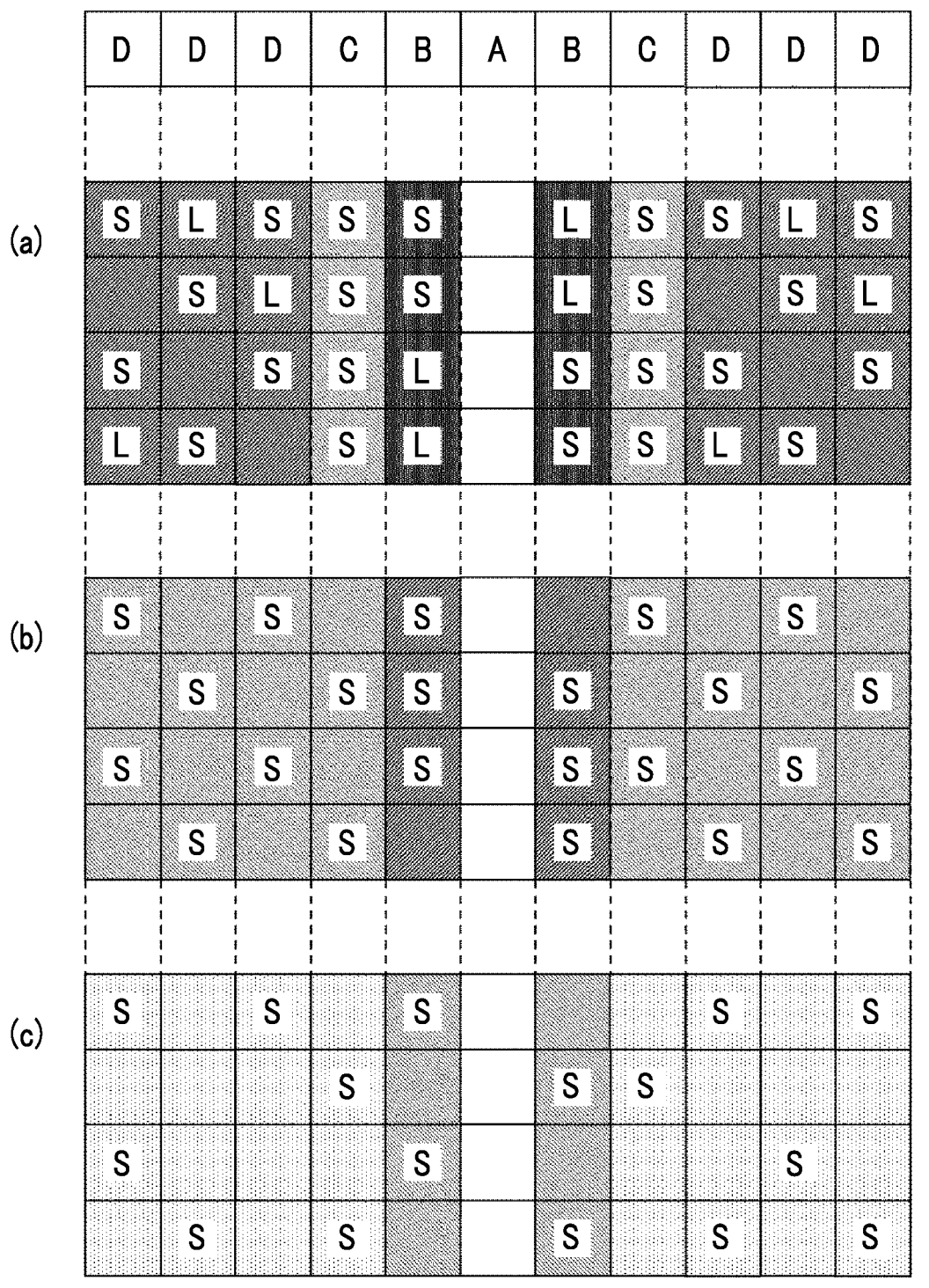

FIGS. 16A to 16C are diagrams schematically illustrating the amount of ink discharged to each region when the halftone processing unit 28 converts the image data into three gradations, that is, a large droplet, a small droplet, and no droplet and illustrates the amount of ink discharged by the head of one color in the image recorded on the sheet P, similarly to FIGS. 15A to 15C. As illustrated in FIGS. 16A to 16C, even when there are two types of droplet size, that is, the large droplet and the small droplet, the average amount of ink in the regions A, B, C, and D is controlled so as to satisfy (Expression 1) to (Expression 3) and it is possible to record the same image.

As described above, according to this embodiment, the amount of ink discharged from each nozzle and the generation rate of droplets are integrally controlled to correct streaks. Specifically, on the shadow side, the generation rate of the large droplet in regions adjacent to both sides of a white streak increases and the amount of ink discharged to the regions increases, as compared to the normal region. In addition, the amount of ink discharged to regions adjacent to the two regions decreases while the generation rate of the small droplet in the regions increases, as compared to the normal region. This pattern is continuously changed such that the correction width is reduced toward the highlight side. Therefore, output data is generated in which, as the gradation is relatively changed from a high gradation (shadow side) to a low gradation (highlight side), the generation rate of the small droplet continuously changes from a value that is greater than the generation rate in the region D to the value of the generation rate in the region D and the amount of ink discharged per unit area continuously changes from the amount of ink in the region C to the amount of ink in the region D.

Therefore, it is possible to fill voids without generating a black streak on the shadow side or the banding of the width of the correction region. In addition, it is possible to correct a streak on the highlight side, without generating banding. Furthermore, since these values continuously change between the gradations, it is possible to perform correction at all gradations with high accuracy.

In this embodiment, control is performed such that the average amount of ink in the correction region is maintained while the generation rate of each droplet is changed. Therefore, the amount of ink and concentration are equal to those in the neighboring region at a single color level. As a result, no streaks occur in both a single color and a mixed color.

When the abnormal nozzle correction process illustrated in FIG. 11 is performed by a computer, a program for the abnormal nozzle correction process may be stored in, for example, a detachable recording medium (not illustrated) and the computer (not illustrated) may read the program and execute the program.

<Low-Frequency Unevenness Correction Process>

Next, a process of generating the concentration equalization LUT used in Step S1 (a low-frequency unevenness correction process; Step S11) will be described.

Figure 17:
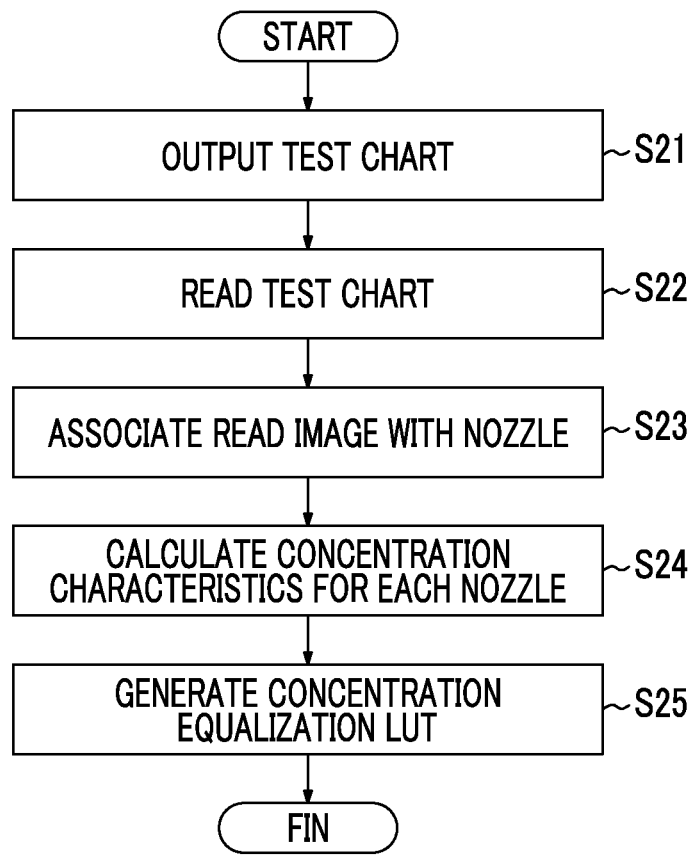
FIG. 17 is a flowchart illustrating a low-frequency unevenness correction process.

FIG. 17 is a flowchart illustrating the low-frequency unevenness correction process performed by the low-frequency unevenness correction processing unit 16. As described above, the concentration equalization LUT is generated by the low-frequency unevenness correction processing unit 16.

(Step S21)

Figure 18:
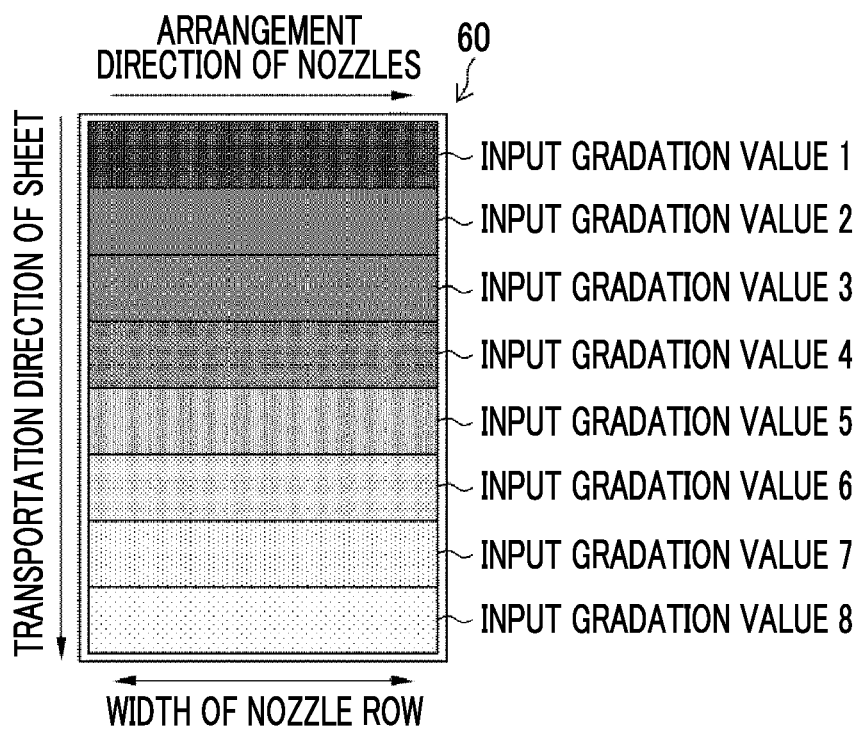
FIG. 18 is a plan view illustrating a concentration measuring test chart recorded on a sheet P.

The image acquisition unit 10 acquires concentration measuring test chart data. The process from Step S1 to Step S4 is performed on the data and the line head 120 outputs a concentration measuring test chart to the recording surface of the sheet P. FIG. 18 is a plan view illustrating a concentration measuring test chart 60 recorded on the sheet P. Here, FIG. 18 illustrates the concentration measuring test chart output by the head of one color among the line heads 120M, 120K, 120C, and 120Y of each color.

As illustrated in FIG. 18, in the concentration measuring test chart 60, a gradation value is constant in the arrangement direction of the nozzles and concentration patches having a predetermined width in the transportation direction of the sheet are output in a plurality of stages (eight stages from an input gradation value 1 to an input gradation value 8 in FIG. 18) in the transportation direction of the sheet. Here, the concentration patches are arranged so as to be printed in ascending order of the input gradation value from the concentration patch with the smallest input gradation value 8 to the concentration patch with the largest input gradation value 1. However, the arrangement and number of stages of the concentration patches are not limited thereto.

Ink is discharged from all of the nozzles of the line head 120 to the sheet P which is transported in the transportation direction of the sheet and the concentration measuring test chart 60 is formed by one scanning operation. Therefore, the length of each concentration patch in a direction perpendicular to the transportation direction of the sheet is equal to the width of the nozzle row.

(Step S22)

Then, the in-line sensor 130 measures (reads) the output concentration measuring test chart 60. Here, it is assumed that the reading resolution of the in-line sensor 130 is lower than the recording resolution of the line head 120. For example, it is assumed that the recording resolution is 1200 dpi and the reading resolution is 500 dpi.

(Step S23)

Then, the read pixels and the nozzles are associated with the image data read by the in-line sensor 130. For example, the association is performed by converting the resolution from the reading resolution (low resolution) of the in-line sensor 130 to the recording resolution (high resolution) of the line head 120 and allocating the converted conversion.

(Step S24)

A Y value (brightness value) for each nozzle is measured for the eight-stage concentration patches of the concentration measuring test chart 60, on the basis of the read pixels associated with the nozzles. Concentration characteristics for each nozzle in which the gradation value is an input and the measured value is an output are calculated from the measurement result.

The concentration characteristics are calculated as follows. First, the input gradation values of eight points corresponding to the actually measured eight-stage concentration patches and the measured values (Y values) corresponding to the input gradation values of the eight points are plotted on a coordinate system in which the horizontal axis is the gradation value and the vertical axis is the measured value. Then, an interpolation process is performed between adjacent plotted points to interpolate the measured value of the input gradation value which has not been actually measured. The interpolation may be performed using an approximate curve which is calculated on the basis of the plotted points.

(Step S25)

Finally, a conversion LUT (concentration equalization LUT) which converts all input gradation values into output gradation values in order to equalize the concentration values at each gradation between the nozzles is generated for each nozzle, on the basis of the inverse function of the concentration characteristics for each nozzle calculated in Step S24. The newly generated concentration equalization LUTs for each nozzle are stored in the concentration equalization LUT storage unit 14.

As such, the test chart is recorded. The recorded test chart is read at a resolution lower than the recording resolution and the concentration equalization LUT is updated on the basis of the read result. Therefore, it is possible to appropriately equalize concentrations for each nozzle.

In addition, the gamma conversion process is performed at a resolution lower than the recording resolution of the line head 120 to update only the concentration equalization LUT and the gamma conversion process is performed at the recording resolution of the line head 120 not to update the gradation-ink discharge amount conversion LUT. Therefore, it is possible to appropriately correct low-frequency unevenness.

Here, the reading resolution of the in-line sensor 130 is lower than the recording resolution of the line head 120. However, the reading operation of the in-line sensor 130 is performed at a resolution that is equal to or higher than the recording resolution of the line head 120 to average the generated concentration equalization LUTs, thereby reducing the resolution.

<Abnormal Nozzle Detection Process>

Next, a process of generating the abnormal nozzle information used in Step S2 (abnormal nozzle detection process; Step S12) will be described.

For example, the in-line sensor 130 reads the abnormal nozzle detecting test chart output from the line head 120 and analyzes the read data to acquire the abnormal nozzle information. In addition, a sensor may detect the discharge state of ink from each nozzle to acquire the abnormal nozzle information. The abnormal nozzle detection unit 22 stores the acquired abnormal nozzle information in the abnormal nozzle storage unit 20.

<Nozzle Correction Process>

Next, a process of generating the A conversion LUT to the D conversion LUT used in Steps $S3_A$, $S3_B$, $S3_C$, and $S3_D$ (nozzle correction process; Step S13) will be described. As described above, the A conversion LUT to the D conversion LUT are generated by the nozzle correction processing unit 27.

The method disclosed in JP2012-45831A can be preferably used to generate the A conversion LUT to the D conversion LUT. That is, the test chart is output using the correction candidate values of the non-discharging nozzle, the output test chart is measured, and the LUT is determined on the basis of the most suitable candidate value. In this case, the candidate values can be set using the relationship of Expression 1 as constraint conditions to appropriately generate the A conversion LUT to the D conversion LUT.

The technical range of the invention is not limited to the range of the above-described embodiments. For example, the structures according to each embodiment can be appropriately combined with each other between the embodiments, without departing from the scope and spirit of the invention.

What is claimed is:

1. An image processing device comprising:
   an image data acquisition unit acquiring image data recorded by discharging ink droplets from a plurality of nozzles, which are provided in an inkjet head and are capable of discharging at least a first ink droplet and a second ink droplet smaller than the first ink droplet, while relatively moving a recording medium and the inkjet head in a first direction;
   a defective nozzle specifying unit specifying a defective nozzle from the plurality of nozzles;
   a division unit dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and
   an output data generation unit performing at least a gamma conversion process and halftone processing on the image data to generate output data,
   wherein the output data generation unit generates output data, in which a generation rate of the first ink droplet, a generation rate of the second ink droplet, and an amount of ink discharged per unit area vary depending on a gradation value of the image data, for each of the divided regions, and generates the following output data for image data with a first gradation value:
   the output data causes the defective nozzle not to discharge ink;
   the output data causes a fourth nozzle corresponding to the fourth pixel row to discharge a first amount of ink per unit area, using the generation rate of the first ink droplet as a first generation rate and the generation rate of the second ink droplet as a second generation rate;
   the output data causes the generation rate of the first ink droplet to be higher than the first generation rate and causes a second nozzle corresponding to the second pixel row to discharge a second amount of ink more than the first amount of ink per unit area;

the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

2. The image processing device according to claim 1, wherein the output data generation unit generates, for the third nozzle, output data in which, as the first gradation value is relatively changed from a high gradation to a low gradation, the generation rate of the second ink droplet is continuously changed from a generation rate higher than the second generation rate to the second generation rate and the amount of ink discharged per unit area is continuously changed from the third amount of ink to the first amount of ink.

3. The image processing device according to claim 1, wherein, when the first amount of ink is $V_1$, the second amount of ink is $V_2$, and the third amount of ink is $V_3$, the output data generation unit generates data satisfying $V_1=(2V_2+2V_3)/5$, regardless of the first gradation value.

4. The image processing device according to claim 1, wherein the output data generation unit includes:

a concentration equalization unit converting the gradation value of the image data, on the basis of information about a resolution lower than a recording resolution of the inkjet head, to equalize concentration in a second direction intersecting the first direction;

a gradation-ink discharge amount conversion unit determining the amount of ink discharged which corresponds to the gradation value of the image data on the basis of the recording resolution of the inkjet head for each of the divided regions; and a halftone processing unit quantizing the image data to output data, which is represented by at least the first ink droplet and the second ink droplet, for each of the divided regions according to the amount of ink discharged.

5. The image processing device according to claim 4, wherein the concentration equalization unit converts the gradation value of the image data using a concentration equalization lookup table.

6. The image processing device according to claim 5, further comprising:

a test chart read data acquisition unit acquiring test chart read data which is read from a test chart image recorded by the inkjet head; and a low-frequency unevenness correction processing unit updating the concentration equalization lookup table on the basis of the test chart read data and equalizing the concentration in the second direction.

7. The image processing device according to claim 5, wherein the gradation-ink discharge amount conversion unit determines the amount of ink discharged which corresponds to the gradation value converted by the concentration equalization lookup table, using an ink discharge amount conversion lookup table for each of the divided regions.

8. The image processing device according to claim 1, wherein the image data is data which is recorded by inkjet heads of a plurality of colors, and the output data generation unit generates data for each inkjet head of a single color.

9. The image processing device according to claim 2, wherein the image data is data which is recorded by inkjet heads of a plurality of colors, and the output data generation unit generates data for each inkjet head of a single color.

10. An inkjet recording device comprising:

the image processing device according to claim 1, an inkjet head including a plurality of nozzles capable of discharging at least the first ink droplet and the second ink droplet;

a moving unit relatively moving the inkjet head and a recording medium in a first direction; and a controller controlling on the basis of output data generated by the image processing device such that ink droplets are discharged from the plurality of nozzles to record an image while relatively moving the inkjet head and the recording medium.

11. An inkjet recording device comprising:

the image processing device according to claim 9, an inkjet head including a plurality of nozzles capable of discharging at least the first ink droplet and the second ink droplet;

a moving unit relatively moving the inkjet head and a recording medium in a first direction; and a controller controlling on the basis of output data generated by the image processing device such that ink droplets are discharged from the plurality of nozzles to record an image while relatively moving the inkjet head and the recording medium.

12. An image processing method using the image processing device according to claim 1, the image processing method comprising:

a step of acquiring image data recorded by discharging ink droplets from a plurality of nozzles, which are provided in an inkjet head and are capable of discharging at least a first ink droplet and a second ink droplet smaller than the first ink droplet, while relatively moving a recording medium and the inkjet head in a first direction;

a defective nozzle specifying step of specifying a defective nozzle from the plurality of nozzles;

a step of dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and an output data generation step of performing at least a gamma conversion process and halftone processing on the image data to generate output data, wherein the output data generation step generates output data, in which a generation rate of the first ink droplet, a generation rate of the second ink droplet, and an amount of ink discharged per unit area vary depending on a gradation value of the image data, for each of the divided regions, and generates the following output data for image data with a first gradation value:

the output data causes the defective nozzle not to discharge ink;

the output data causes a fourth nozzle corresponding to the fourth pixel row to discharge a first amount of ink per unit area, using the generation rate of the first ink droplet as a first generation rate and the generation rate of the second ink droplet as a second generation rate;

the output data causes the generation rate of the first ink droplet to be higher than the first generation rate and causes a second nozzle corresponding to the second pixel row to discharge a second amount of ink more than the first amount of ink per unit area;

the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

13. A non-transitory computer readable medium storing a program causing a computer to execute an image processing method according to claim 12, the program comprising:

a function of acquiring image data recorded by discharging ink droplets from a plurality of nozzles, which are provided in an inkjet head and are capable of discharging at least a first ink droplet and a second ink droplet smaller than the first ink droplet, while relatively moving a recording medium and the inkjet head in a first direction;

a defective nozzle specifying function of specifying a defective nozzle from the plurality of nozzles;

a function of dividing the image data into regions corresponding to a first pixel row which corresponds to the defective nozzle and is arranged in the first direction, a second pixel row which is adjacent to the first pixel row, a third pixel row which is adjacent to the second pixel row on a side opposite to the first pixel row, and a fourth pixel row other than the first pixel row, the second pixel row, and the third pixel row; and an output data generation function of performing at least a gamma conversion process and halftone processing on the image data to generate output data, wherein the output data generation function includes a function of generating output data, in which a generation rate of the first ink droplet, a generation rate of the second ink droplet, and an amount of ink discharged per unit area vary depending on a gradation value of the image data, for each of the divided regions, and generating the following output data for image data with a first gradation value:

the output data causes the defective nozzle not to discharge ink;

the output data causes a fourth nozzle corresponding to the fourth pixel row to discharge a first amount of ink per unit area, using the generation rate of the first ink droplet as a first generation rate and the generation rate of the second ink droplet as a second generation rate;

the output data causes the generation rate of the first ink droplet to be higher than the first generation rate and causes a second nozzle corresponding to the second pixel row to discharge a second amount of ink more than the first amount of ink per unit area;

the output data causes the generation rate of the second ink droplet to be higher than the second generation rate and causes a third nozzle corresponding to the third pixel row to discharge a third amount of ink less than the first amount of ink per unit area when the first gradation value is greater than a predetermined value; and the output data causes the third nozzle to discharge the first amount of ink per unit area, using the generation rate of the second ink droplet as the second generation rate, when the first gradation value is less than the predetermined value.

* * * * *